United States Patent
Goto et al.

(10) Patent No.: US 8,242,201 B2
(45) Date of Patent: Aug. 14, 2012

(54) PIGMENT DISPERSION, RECORDING INK, INK CARTRIDGE, INK-JET RECORDING METHOD AND INK-JET RECORDING APPARATUS

(75) Inventors: Hiroshi Goto, Atsugi (JP); Akihiko Matsuyama, Isehara (JP); Kiyofumi Nagai, Machida (JP)

(73) Assignee: Ricoh Company, Ltd., Tokyo (JP)

(*) Notice: Subject to any disclaimer, the term of this patent is extended or adjusted under 35 U.S.C. 154(b) by 1040 days.

(21) Appl. No.: 12/158,550

(22) PCT Filed: Dec. 15, 2006

(86) PCT No.: PCT/JP2006/325667
§ 371 (c)(1),
(2), (4) Date: Jun. 20, 2008

(87) PCT Pub. No.: WO2007/072951
PCT Pub. Date: Jun. 28, 2007

(65) Prior Publication Data
US 2009/0176070 A1    Jul. 9, 2009

(30) Foreign Application Priority Data

Dec. 22, 2005 (JP) ................... 2005-369354
Jan. 18, 2006 (JP) ................... 2006-009952

(51) Int. Cl.
*C08L 35/00* (2006.01)

(52) U.S. Cl. .......... 524/549; 524/570; 524/579

(58) Field of Classification Search .......... 524/549, 524/570; 523/160, 161; 428/195.1
See application file for complete search history.

(56) References Cited

U.S. PATENT DOCUMENTS

| | | | |
|---|---|---|---|
| 5,607,999 A | 3/1997 | Shimizu et al. | |
| 5,859,092 A | 1/1999 | Hirasa et al. | |
| 5,883,157 A | 3/1999 | Yamashita et al. | |
| 2003/0078338 A1* | 4/2003 | Schlarb et al. | 524/556 |
| 2004/0068030 A1 | 4/2004 | Aida | |

(Continued)

FOREIGN PATENT DOCUMENTS

CN    1495238 A    5/2004

(Continued)

OTHER PUBLICATIONS

EASTMAN AQ 38S Polymer (downloaded Oct. 27, 2011).*

(Continued)

*Primary Examiner* — David W Wu
*Assistant Examiner* — Vu A Nguyen
(74) *Attorney, Agent, or Firm* — Oblon, Spivak, McClelland, Maier & Neustadt, L.L.P.

(57) ABSTRACT

A pigment dispersion is provided that includes a pigment, a pigment dispersant, a polymer dispersion stabilizer and water, wherein the polymer dispersion stabilizer is an alpha-olefin/maleic anhydride copolymer expressed by the formula (1) below. A recording ink is also provided that includes the pigment dispersion, a surfactant, a water-dispersible resin, a humectant and water.

Formula (1)

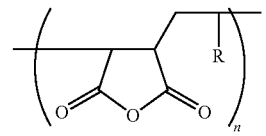

In the structural formula (1), R represents an alkyl group and n is an integer of 30 to 100.

19 Claims, 4 Drawing Sheets

U.S. PATENT DOCUMENTS

2006/0000392 A1    1/2006    Reisacher et al.

FOREIGN PATENT DOCUMENTS

| | | |
|---|---|---|
| CN | 1711320 A | 12/2005 |
| EP | 0 540 757 A1 | 5/1993 |
| EP | 757108 A2 * | 2/1997 |
| GB | 752205 | 7/1956 |
| JP | 31-5218 | 6/1956 |
| JP | 55 69464 | 5/1980 |
| JP | 55 157668 | 12/1980 |
| JP | 62 1426 | 1/1987 |
| JP | 1 217088 | 8/1989 |
| JP | 4 18462 | 1/1992 |
| JP | 4 211478 | 8/1992 |
| JP | 4 332774 | 11/1992 |
| JP | 5-117567 | 5/1993 |
| JP | 6-200199 | 7/1994 |
| JP | 6-220376 | 8/1994 |
| JP | 8-269361 | 10/1996 |
| JP | 9 111166 | 4/1997 |
| JP | 9-157564 | 6/1997 |
| JP | 2667401 | 6/1997 |
| JP | 2675001 | 7/1997 |
| JP | 9 263720 | 10/1997 |
| JP | 9 263722 | 10/1997 |
| JP | 2867491 | 12/1998 |
| JP | 11 166127 | 6/1999 |
| JP | 11-246813 | 9/1999 |
| JP | 2000 95983 | 4/2000 |
| JP | 2000-169774 | 6/2000 |
| JP | 2000 191972 | 7/2000 |
| JP | 3088588 | 7/2000 |
| JP | 2001 192582 | 7/2001 |
| JP | 2001 262025 | 9/2001 |
| JP | 2002 88286 | 3/2002 |
| JP | 2002 146231 | 5/2002 |
| JP | 2002 161221 | 6/2002 |
| JP | 2002 265831 | 9/2002 |
| JP | 2002 337449 | 11/2002 |
| JP | 2002-371212 | 12/2002 |
| JP | 2003 49096 | 2/2003 |
| JP | 2003 55591 | 2/2003 |
| JP | 2003 105229 | 4/2003 |
| JP | 2003 171594 | 6/2003 |
| JP | 2003 192938 | 7/2003 |
| JP | 2003 226827 | 8/2003 |
| JP | 2003 268278 | 9/2003 |
| JP | 2003 277685 | 10/2003 |
| JP | 2003 327866 | 11/2003 |
| JP | 2003 327880 | 11/2003 |
| JP | 2004 2715 | 1/2004 |
| JP | 2004 35718 | 2/2004 |
| JP | 2004 99800 | 4/2004 |
| JP | 2004 155867 | 6/2004 |
| JP | 2004 195706 | 7/2004 |
| JP | 2004 203903 | 7/2004 |
| KR | 10-2005-0075423 A | 7/2005 |
| WO | WO 9715382 A1 * | 5/1997 |
| WO | 2004 046251 | 6/2004 |

OTHER PUBLICATIONS

European Search Report issued Jun. 7, 2011, in Patent Application No. 06835130.3.

Office Action issued Jan. 18, 2011 in Japan Application No. 2006-009952.

Office Action issued Feb. 25, 2011in Chinese patent Application No. 200680051552.9.

* cited by examiner

PIGMENT DISPERSION, RECORDING INK, INK CARTRIDGE, INK-JET RECORDING METHOD AND INK-JET RECORDING APPARATUS

TECHNICAL FIELD

The present invention relates to pigment dispersions that exhibit superior pigment-dispersion stability under long-term storage, recording inks suited to ink-jet recording, and also ink cartridges, ink-jet recording methods and ink-jet recording apparatuses.

BACKGROUND ART

Recently, ink-jet printers have become widely used by virtue of lower noise and relatively less running cost, and also color printers printable on regular paper have been actively put into the market. However, it is very difficult for ink-jet printers to satisfy all of common properties such as color reproducibility, endurance, lightfastness, image-drying property, non-feathering or non-bleeding of images, double-face printing and discharge stability, thus inks are selectively employed considering important properties for respective applications.

The inks for ink-jet printers are typically based on water and contain colorants like dyes or pigments and humectants such as glycerin to prevent clogging. The colorants are usually dyes in view of superior color-producing property and stability. However, lightfastness and water resistance of images formed from inks containing dyes are relatively inferior. Specifically, the water resistance of images is unsatisfactory on regular paper, although it may be somewhat improved on dedicated ink-jet recording paper having an ink-absorbing layer.

In order to solve these problems, recently, alternative recording inks have been investigated in which pigments, in place of the dyes, such as organic pigments and carbon black are micronized with surfactants or dispersants and dispersed into media such as water. Patent Literatures 1 and 2, for example, disclose methods for improving ejection stability by way of micronizing organic pigments into a particle diameter of 50 nm or less using specific dispersants. Patent Literature 3 discloses an ink-jet ink using a specific organic pigment and an anionic dispersant.

However, it is impossible to micronize organic pigments into below their primary sizes regardless of any dispersants. Furthermore, it is very difficult to reduce the particle size of organic pigments into 50 nm or less without degrading color tone. Furthermore, in cases where pigment dispersants of lower-molecular weights are employed, there exists a problem that dispersion stability of pigments is inferior, pigments are likely to coagulate with aqueous solvents in inks; in cases where pigment dispersants of lower-molecular weights are employed, the dispersibility is likely to be poor due to higher velocities of pigment dispersions. There exist also a problem that printed matters from these inks are insufficient for scratch resistance and water resistance.

Since ink-jet recording requires stable discharge of ink droplets from a minute nozzle of ink-jet recording heads, it is necessary that the ink is far from solidification due to drying at orifices of the ink-jet recording heads. In cases where inks of dispersed organic pigments are utilized for ink-jet recording, however, dispersion stability of pigments may be degraded under long-term storage in particular, thus the resulting coagulation of pigments may lead to clogging of ejection nozzles of ink-jet recording heads or non-ejection of inks. Especially when the printing is suspended for a long period, nozzle clogging is likely to occur, and the thickened inks may deposit within maintenance devices such as nozzle caps or suction tubes, which possibly hindering the function of maintenance devices. Furthermore, when printing is temporarily suspended or nozzles are stopped for a short period due to blanks or a single blank in printing documents, there often occur problems such as printing failures or intermittent discharge-failures due to distorted-injection direction of ink droplets.

As for the other dispersing methods of organic pigments, so-called surface-modified recording inks are proposed in which pigments are stably dispersed, with no dispersant, by way of modifying the pigment-particle surface into hydrophilic with carboxyl group, carbonyl group, sulfone group, hydroxyl group, and the like. As for black recording inks, for example, so-called surface-modified carbon blacks have been developed in which carbon blacks are stably dispersed, with no dispersant, by way of introducing hydrophilic groups on the carbon surface. In addition, as for inks of color pigments, so-called surface-modified color pigments have been developed in which the color pigments are stably dispersed with no dispersant. However, these surface-modified recording inks typically lack scratch resistance on regular paper or dedicated gloss paper, and represent poor water resistance.

In order solve the problems described above, there is proposed an ink-jet ink containing microcapsules or emulsion where pigment particles are coated with a resin. In accordance with such a proposal, since the pigment particles are coated solidly by the resin, dispersion may be stable for a long period and the ejection stability may be improved; however, it is expensive and difficult to make the dispersion particle diameter into 150 nm or less even pigments with a primary particle diameter 50 nm to 100 nm are coated with the resin.

Patent Literatures 4 and 5 describe a proposal in which a colorant may be provided with a nanometer-particle diameter and a uniform particle size distribution by way of depositing a dye onto the surface of metal oxides and then coating it with an organic compound having an ionic group, and the resulting colorant can be utilized for ink-jet inks. In accordance with this proposal, water resistance may be improved compared to inks utilizing dyes; however, lightfastness tends to be inferior to the inks utilizing dyes, thus the resulting inks are inappropriate for actual use.

As such, in cases where dispersants are utilized for dispersing pigments or pigment surfaces are treated to be hydrophilic, a resin may be added to inks in order to complement the lack of water resistance and scratch resistance; however, it is typically impossible to obtain sufficient water resistance when water-soluble polymers are utilized. For this reason, methods using water-dispersible resins are proposed; however, the water resistance is still insufficient since the printed resin particles on recorded matters may easily disperse into water again.

Recently, composite pigments are proposed in which an organic pigment is coated over inorganic pigment particles. When inorganic pigment particles of about 5 to 50 nm are utilized as a core material, it is possible to obtain a colorant pigment of less than 100 nm even when being coated with an organic pigment (see Patent Literatures 6 and 7). Complex-pigment colorants of 10 to 20 nm are commercially available already. Application of these composite pigment particles to paints or ink-jet inks are also proposed as disclosed in Patent Literatures 8 and 9. However, these composite pigment particles also suffer from the inferior dispersion stability in particular under long-term storage and insufficient water resistance and scratch resistance of printed matters because of containing no fixing resin.

Ink compositions containing resins are also proposed, for example, an ink containing a pigment and a water-dispersible resin dispersed in water as disclosed in Patent Literature 10; an ink containing a pigment dispersed in polymer emulsion dispersion of a water-insoluble resin as disclosed in Patent Literature 11; and an ink using an emulsion having a specific film-forming temperature as disclosed in Patent Literature 12.

In addition, there exist many proposals with respect to addition of polymer dispersants in order to improve fixing ability of the complex pigment particles as disclosed in Patent Literatures 9, 13, 14, 15, 16, 17, 18 and 19. In these proposals, polymer dispersants are expected to enhance the fixing ability. However, these polymer dispersants typically suffer from insufficient water resistance due to their water solubility even though the scratch resistance may be sufficiently improved.

Accordingly, such materials are demanded currently as a pigment dispersion that can exhibit superior pigment-dispersion stability under long-term storage; a recording ink, containing the pigment dispersion, that can represent superior ejection stability without head clogging at printing, that can bring about superior image durability such as water resistance and lightfastness, that can provide high-quality images with superior color tone on not only dedicated recording paper but also regular paper, and that is suited to ink-jet recording; and the related technologies.

As for inks for the ink-jet recording at homes and offices, aqueous inks are typically utilized that are based on water and contain colorants, humectants such as glycerin, wetting agents to control permeability into recording paper, surfactants and other optional additives.

The ink-jet recording of aqueous inks is fixed typically through permeation of the aqueous inks into recording media, therefore, dedicated ink-jet recording paper has been developed that is provided with enhanced absorbability, fixing ability for coloring components on paper surface, and protection ability for the coloring components. However, the dedicated ink-jet recording paper is relatively expensive since its production process involves multiple coating processes after paper making and is inferior to the regular paper in terms of recycle ability because of containing many processing chemicals; as such, sufficient image quality on regular paper is desired currently.

The regular paper represents inferior ink-absorbability and less assistance in ink performances compared to dedicated ink-jet recording paper, therefore, there exist such problems in recording on regular paper as (1) occurrence of feathering, (2) occurrence of bleeding, (3) reduction of density, (4) reduction of color developing property, (5) reduction of water resistance, (6) reduction of light resistance, (7) reduction of gas resistance, (8) reduction of fixing property, (9) show through of ink, and the like. It is important to solve these problems in order to carry out the ink-jet recording on the regular paper.

In recent years, pigments have been often used for ink-jet inks through improvement of pigment-dispersibility and/or micronization of particle diameter. The pigment-dispersibility has been improved through improving self-dispersion stability i.e. imparting hydrophilicity by way of surface modification such as oxidation, sulfonation, or graft polymerization on pigment surface in addition of conventional pigment dispersion using surfactants and/or water-soluble resins. These pigments may improve the above-described (5), (6) and (7); the concentration and coloring property of the modified pigments are inferior to those of dyes, and also the ejection stability, long-term preservability and re-dispersibility of the pigment inks are inferior to those of dye inks. Thus, in cases where pigments are used as colorants, it is important to enhance ink density, color development, and reliability. In order to address these problems, for example, a number of ink-jet recording inks are proposed that contain colored polymer particles, in particular emulsion of polyester or vinyl based polymer particles (see Patent Literature 20, non-Patent Literature 1). These proposals encompass inks containing a colorant-including resin dispersion, in which the colorant is included in a water-insoluble, aqueous dispersible resin. When color organic pigments are used as the colorant, the image density and the color reproducibility under conventional ink formulations on regular paper are superior to those of pigment inks with water-soluble dispersants.

Heretofore, control of ink permeability into the paper has been investigated in order to reduce feathering and bleeding, to enhance printing density and color development and to suppress show through. A super-permeable ink-jet ink is commercially available of which the surface tension is adjusted to below 35 mN/m to enhance permeability into paper. Such inks effectively reduce the bleeding and are easily dried on regular paper, meanwhile there exist such deficiencies as feathering, lower print density and lower print quality. On the other hand, a slow-permeation ink is also commercially available of which the surface tension is adjusted to above 35 mN/m thereby to slow permeation into paper and to hold the ink on surface area of the paper, which may effectively lower feathering, increase print density and color development, and to reduce show through.

However, the lower permeability degrades remarkably the drying ability after printing on the regular paper, thus resulting in deterioration of fixing ability and/or bleeding between colors in cases of multiple-color print. In view of these problems, a complex ink set has been developed and utilized in which a slow-permeation ink and a super-permeable ink are combined to suppress the bleeding between colors thereby to assure image quality. However, in cases of double-sided printing using slow-permeation inks, a period is required to wait ink-drying after printing, which deteriorate productivity of the double-sided printing. A printing apparatus is also commercially available which is equipped with a device to heat paper before and after the printing in order to enhance ink-drying ability (see Patent Literature 21). However, such apparatuses suffer from enlarged and complicated systems and wasteful heating energy due to additional heating devices, which diminish advantages the advantages of ink-jet recording.

Beside these proposals, ink-jet inks have been investigated variously with respect to reliability as well as image quality. Prevention of ink-viscosity increase is demanded to suppress clogging of nozzle heads. For example, Patent Literature 22 discloses that ink-voids can be prevented by way of controlling viscosity-change into below 10 times and diameter-change into below three times comparing after to before condensing concentration of inks two times thereby making pigments suppress the ink-spreading. Such inks, however, hardly produce high quality images on regular paper.

Patent Literature 23 discloses an ink in which residual after evaporating volatile contents in the ink is a liquid and the viscosity of the residual is below 10 times of the initial viscosity. However, the ink is one containing a dye thus also likely to provide poor image-quality regardless of higher reliability.

Patent Literature 24 discloses an ink in which the viscosity-increase is below 600 times comparing after to before water-evaporation at 60° C. However, the ink is also one containing a dye thus the water resistance is still insufficient in spite that reliability as well as durability are intended to increase by addition of water-soluble polymer.

Patent Literature 25 discloses that an ink with a viscosity of 5 to 15 mPa·s is appropriate in order to assure higher quality. This literature disclose that a certain compound may be favorably added to adjust initial-vaporization velocity and to arrange viscosity for reliability; which may suggest a solution to solve items (3) and (4) in terms of those containing pigments. However, this literature includes no description in terms of particle-size stability of pigments, that is, the ink may lack reliability under long-term preservation depending on ejection heads and/or nozzle sizes although it may be reliable after preservation for 24 hours.

As described above, it is necessary to use high-viscosity inks in order to assure high-quality printing under higher velocities, meanwhile it is difficult to assure reliability of high-viscosity inks.

Patent Literatures 10 and 11 disclose addition of Water-insoluble resins into pigment inks for improving image quality. Patent Literature 26 discloses that images on regular paper can be improved using an ink in which the ratio of pigments to resin emulsions is 1:0.1 to 1:1 and the average particle diameter of coloring ingredients is 0.3 to 1.2 µm. Such inks' containing resin emulsions may suppress feathering through lowering the bleeding, however, are likely to lack reliability as ink-jet inks due to insufficient image density. As for improvement in reliability, Patent Literature 27 discloses an ink in which a water-insoluble is added to the ink and the lowest temperature to form films is 40° C. or more; Patent Literature 28 discloses an ink in which the particle diameter of additional emulsions is no more than 50 nm. However, the reliability of these inks is likely to be still unsatisfactory and the image quality is insufficient still. Patent Literature 29 discloses improvement in printing nonuniformity by use of inks containing a pigment, saccharide or derivatives thereof, polyols containing five or more hydroxyl groups and a resin emulsion. Suck inks tend to exhibit lower permeability into regular paper and are problematic in terms of feathering and/or bleeding, fixing ability and drying period. Patent Literature 30 discloses an ink consisting of a water-dispersible resin and a self-dispersible pigment in which the solid content is 1.0 to 16% by mass and image quality is improved on regular paper. This proposal may lead to higher water resistance compared to those containing dyes; however, image supporting property may be insufficient with respect to marker pens often utilized for regular paper.

Furthermore, many investigations have been made regarding to viscosity increase along with solid-content increase when pigment dispersions and resin emulsions are added to inks. For example, Patent Literatures 29 and 31 disclose ink formulations in which viscosity-increase is not so significant in spite of solid-content increase by way of adding a resin capable of forming micelle aggregates. However, these proposals suffer from lower image quality due to insufficient permeability onto regular paper. The permeability onto paper can be explained through capillary absorption represented by Lucas-Washburn formula; and the higher is the viscosity, the lower surface tension and/or the less contact angle between paper and inks is required to achieve sufficient permeability. Patent Literatures 32 and 33 propose addition of polyvalent alcohol alkylethers into inks of higher solid-contents in order to improve permeability; however, these proposals suffer from lower image quality due to insufficient permeability in cases where the viscosity increases while the solid content increases.

It is publicly known that silicone surfactants and fluorine-containing surfactants can enhance permeability even in a minute amount and their employment has been investigated in the art. For example, Patent Literatures 34 and 35 propose ink-jet inks with fluorine-containing surfactants; Patent Literatures 36 and 37 propose inks with pigment dispersions and fluorine-containing surfactants. Patent Literature 38 also proposes an ink, with a viscosity of no less than 5 mPa·s, including a fluorine-containing surfactant and a polymer emulsion formed from polymer fine particles and water-insoluble or hardly soluble coloring materials. However, these proposals suffer from hue change along with increase of pigment content in inks, thus it is difficult to attain favorable hue at higher pigment contents, and also the water resistance and fixing ability acre likely to be insufficient in cases of self-dispersion pigments.

Patent Literature 1: Japanese Patent Application Laid-Open (JP-A) No. 09-263720
Patent Literature 2: JP-A No. 09-263722
Patent Literature 3: JP-A No. 2002-88286
Patent Literature 4: JP-A No. 11-166127
Patent Literature 5: JP-A No. 2001-192582
Patent Literature 6: JP-A No. 2002-146231
Patent Literature 7: JP-A No. 2002-161221
Patent Literature 8: JP-A No. 2003-49096
Patent Literature 9: JP-A No. 2003-55591
Patent Literature 10: Japanese Patent Application Publication (JP-B) No. 62-1426
Patent Literature 11: JP-A No. 55-157668
Patent Literature 12: JP-A No. 01-217088
Patent Literature 13: JP-A No. 2003-49096
Patent Literature 14: JP-A No. 2003-105229
Patent Literature 15: JP-A No. 2003-171594
Patent Literature 16: JP-A No. 2003-192938
Patent Literature 17: JP-A No. 2003-327866
Patent Literature 18: JP-A No. 2003-268278
Patent Literature 19: JP-A No. 2003-327880
Patent Literature 20: JP-A No. 2000-191972
Patent Literature 21: JP-A No. 55-69464
Patent Literature 22: JP-A No. 2002-337449
Patent Literature 23: JP-A No. 2000-095983
Patent Literature 24: JP-A No. 09-111166
Patent Literature 25: JP-A No. 2001-262025
Patent Literature 26: JP-A No. 04-332774
Patent Literature 27: Japanese Patent (JP-B) No. 2867491
Patent Literature 28: JP-A No. 04-18462
Patent Literature 29: JP-B No. 3088588
Patent Literature 30: JP-A No. 2004-35718
Patent Literature 31: JP-A No. 2004-99800
Patent Literature 32: JP-A No. 2004-155867
Patent Literature 33: JP-A No. 2004-203903
Patent Literature 34: JP-B No. 2675001
Patent Literature 35: JP-B No. 2667401
Patent Literature 36: JP-A No. 04-211478
Patent Literature 37: JP-A No. 2003-277658
Patent Literature 38: JP-A No. 2003-226827
Non-Patent Literature 1: Applied Expansion of Functional Pigment Technology, by CMC Co., Ltd.

DISCLOSURE OF INVENTION

The present invention aims primarily to provide a pigment dispersions that exhibits superior dispersion stability under long-term storage; a recording ink, using the pigment dispersion and suited to ink-jet recording, that exhibits excellent ejection stability without head clogging, provides images with superior durability such as water resistance and lightfastness, and forms high-quality images with proper color tone on not only dedicated recording paper but also on regular paper; an ink cartridge using the recording ink, an ink-jet recording method and an ink-jet recording apparatus.

The present invention aims secondarily to provide a recording ink that affords superior image quality on regular paper with no inkless void and with higher image density, color, saturation, durability such as water resistance and light-fastness, and represents excellent drying property and beading on gloss paper, superior drying velocity and high-speed printing, and appropriate ejection stability from nozzles; and also an ink cartridge using the recording ink, an ink-jet recording method and ink-jet recording apparatus.

These objects can be attained by the present invention described below.

In a first aspect, the present invention provides a pigment dispersion, including a pigment, a pigment dispersant, a polymer dispersion stabilizer and water, wherein the polymer dispersion stabilizer is an alpha-olefin/maleic anhydride copolymer expressed by the formula (1) below:

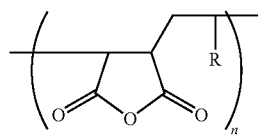

Formula (1)

in the formula (1), R represents an alkyl group and n is an integer of 30 to 100.

Preferably, the acid value of the alpha-olefin/maleic anhydride copolymer is 100 to 400 mgKOH/g.

Preferably, the alpha-olefin/maleic anhydride copolymer is used as a solution in an alkaline solution or in an alkaline aqueous solution, and the alkali amount in the alkaline solution or in the alkaline aqueous solution is no less than that corresponding to the acid value of the alpha-olefin/maleic anhydride copolymer.

Preferably, the pigment is an organic pigment, or a complex pigment of an inorganic pigment coated with an organic pigment.

Preferably, the organic pigment is one selected from phthalocyanine pigments, quinacridone pigments and monoazo yellow pigments.

Preferably, the inorganic pigment particles are at least one selected from titanium dioxide particles, silica particles, alumina particles, iron oxide particles, iron hydroxide particles and tin oxide particles.

Preferably, the pigment dispersant is one of anionic surfactants and nonionic surfactants having an HLB Value of 10 to 20.

Preferably, the average particle diameter $D_{50}$ of the pigment dispersion is no larger than 150 nm.

In another aspect, the present invention provides a recording ink, including a pigment dispersion described above, a surfactant, a water-dispersible resin, a humectant and water.

Preferably, the surfactant is one of silicone surfactants and fluorine-containing surfactants.

Preferably, the water-dispersible resin exhibits a film-forming ability after printing on a recording media, and has a minimum film-forming temperature of no higher than 30° C.

Preferably, the humectant is at least one selected from glycerin, diethylene glycol, triethylene glycol, 1,3-butanediol and 3-methyl-1,3-butanediol.

Preferably, the recording ink further includes a pH adjuster of at least one selected from alcohol amines, alkali metal hydroxides, ammonium hydroxides, phosphonium hydroxides and alkali metal carbonates, and pH of the recording ink is 7 to 11.

In still another aspect, the present invention provides a recording ink, including a water-dispersible colorant, a water-dispersible resin, a humectant and water, wherein the water-dispersible colorant is a pigment dispersion that includes a pigment, a pigment dispersant and a polymer dispersion stabilizer, the polymer dispersion stabilizer is an alpha-olefin/maleic anhydride copolymer expressed by the formula (1) below, or a mixture of the alpha-olefin/maleic anhydride copolymer and at least one of styrene/acrylic copolymers, water-soluble polyurethane resins and water-soluble polyester resins, the content of the humectant is 20 to 35% by mass in the recording ink, the solid content of the water-dispersible resin in the ink (A) and the solid content of the pigment in the water-dispersible colorant (B) satisfy a relation with respect to their ratio (A/B) of 2 to 8,

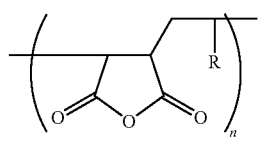

Formula (1)

in the formula (1), R represents an alkyl group, n is an integer of 30 to 100.

In still another aspect, the present invention provides a recording ink, including a water-dispersible colorant, a water-dispersible resin, a humectant and water, wherein the water-dispersible colorant is a pigment dispersion that includes a pigment and a polymer dispersion stabilizer, the pigment bears at least a hydrophilic group on the surface and behaves as a self-dispersible pigment of water-dispersibility or water-solubility in the absence of dispersant, the polymer dispersion stabilizer is an alpha-olefin/maleic anhydride copolymer expressed by the formula (1) below, or a mixture of the alpha-olefin/maleic anhydride copolymer and at least one of styrene/acrylic copolymers, water-soluble polyurethane resins and water-soluble polyester resins, the content of the humectant is 20 to 35% by mass in the recording ink, the solid content of the water-dispersible resin in the ink (A) and the solid content of the pigment in the water-dispersible colorant (B) satisfy a relation with respect to their ratio (A/B) of 2 to 8,

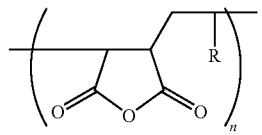

Formula (1)

in the formula (1), R represents an alkyl group, n is an integer of 30 to 100.

Preferably, the entire content of the water-dispersible colorant and the water-dispersible resin is 12 to 40% by mass based on the entire recording ink.

Preferably, the mass average molecular weight of the alpha-olefin/maleic anhydride copolymer is no higher than 20000.

Preferably, the alpha-olefin/maleic anhydride copolymer has an acid value of 100 to 400 mgKOH/g, and is used as a solution in an alkaline solution or an alkaline aqueous solution containing an alkali amount of no less than that corresponding to its acid value.

Preferably, the pigment dispersant is one of anionic surfactants and nonionic surfactants having an HLB value of 10 to 20.

Preferably, the nonionic surfactant having an HLB value of 10 to 20 is one of polyoxyethylene beta-naphthylether, polyoxyethylene laurylether and polyoxyethylene styrenephenylether.

Preferably, the water-dispersible resin is one of polyester resins, polyurethane resins, acrylic resins and acrylic silicone resins, and the minimum film-forming temperature of the water-dispersible resin is no higher than 30° C.

Preferably, the humectant is at least one selected from glycerin, diethylene glycol, triethylene glycol, 1,3-butanediol and 3-methyl-1,3-butanediol.

Preferably, the recording ink further includes a surfactant, and the surfactant includes at least one selected from silicone surfactants and fluorine-containing surfactants.

Preferably, the recording ink has a viscosity of 5 to 20 mPa·s at 25° C. and a surface tension of no higher than 35 mN/m at 25° C.

In still another aspect, the present invention provides an ink cartridge, including a container to house a recording ink described above.

In still another aspect, the present invention provides an ink-jet recording method, including ejecting a recording ink described above so as to record an image, by applying a stimulus to the recording ink.

Preferably, the stimulus is at least one selected from heat, pressure, vibration and light.

In still another aspect, the present invention provides an ink-jet recording apparatus, including an ink ejecting unit configured to eject a recording ink described above so as to record an image, by applying a stimulus to the recording ink.

Preferably, the stimulus is at least one selected from heat, pressure, vibration and light.

In still another aspect, the present invention provides an ink recorded matter, including an image formed from a recording ink described above on a recording medium.

The pigment dispersion according to the present invention includes a pigment, a pigment dispersant, a polymer dispersion stabilizer and water, in which the polymer dispersion stabilizer is an alpha-olefin/maleic anhydride copolymer expressed by the formula (1) described above. The combination of these ingredients may improve dispersion stability of the pigment under long-term storage, thus the pigment dispersion may be utilized as a colorant for ink-jet recording inks in particular.

The recording ink according to the present invention, in the first embodiment, includes the pigment dispersant according to the present invention, a surfactant, a water-dispersible resin, a humectant and water. The recording ink according to the present invention may bring about, by virtue of the pigment dispersion according to the present invention, excellent ejection stability without head clogging at printing, highly durable images with superior water resistance and lightfastness, and high quality images with favorable color tone on not only dedicated recording paper but also regular paper.

The ink cartridge according to the present invention includes a container to house the inventive recording ink of the first embodiment. The ink cartridge may be appropriately utilized for printers etc. of ink-jet recording processes. The recording by use of the ink in the ink cartridge may bring about excellent ejection stability without head clogging at printing, highly durable images with superior water resistance and lightfastness, and high quality images with favorable color tone on not only dedicated recording paper but also regular paper.

The inventive ink-jet recording apparatus includes an ink electing unit that applies energy to the inventive recording ink of the first embodiment to record images through ejecting the recording ink. In the ink-jet recording apparatus, energy is applied to the inventive recording ink, and the inventive recording ink is ejected from nozzles, thereby recording images. Consequently, printing may be carried out with excellent ejection stability without head clogging, images may be formed with high durability such as water resistance and lightfastness, and high quality images with favorable color tone may be formed on not only dedicated recording paper but also regular paper.

The inventive ink-jet recording method includes an ink electing step that applies energy to the inventive recording ink of the first embodiment to record images through ejecting the recording ink. In the ink-jet recording method, energy is applied to the inventive recording ink, and the inventive recording ink is ejected from nozzles, thereby recording images. Consequently, printing may be carried out with excellent ejection stability without head clogging, images may be formed with high durability such as water resistance and lightfastness, and high quality images with favorable color tone may be formed on not only dedicated recording paper but also regular paper.

The ink recorded matter according to the present invention includes an image formed from the inventive recording ink of the first embodiment on a recording medium. The image may be formed on the ink recorded matter with excellent ejection stability without head clogging at printing, highly durable with superior water resistance and lightfastness, and of high quality with favorable color tone on not only dedicated recording paper but also regular paper.

The inventive recording ink includes, in the second embodiment, a water-dispersible colorant, a water-dispersible resin, a humectant and water, in which the water-dispersible colorant is a pigment dispersion that includes a pigment, a pigment dispersant and a polymer dispersion stabilizer, the polymer dispersion stabilizer is an alpha-olefin/maleic anhydride copolymer expressed by the formula (1) described above, or a mixture of the alpha-olefin/maleic anhydride copolymer and at least one of styrene/acrylic copolymers, water-soluble polyurethane resins and water-soluble polyester resins, the content of the humectant is 20 to 35% by mass in the recording ink, the solid content of the water-dispersible resin in the ink (A) and the solid content of the pigment in the water-dispersible colorant (B) satisfy a relation with respect to their ratio (A/B) of 2 to 8.

The inventive recording ink includes, in the third embodiment, a water-dispersible colorant, a water-dispersible resin, a humectant and water, in which the water-dispersible colorant is a pigment dispersion that includes a pigment and a polymer dispersion stabilizer, the pigment bears at least a hydrophilic group on the surface and behaves as a self-dispersible pigment of water-dispersibility or water-solubility in the absence of dispersant, the polymer dispersion stabilizer is an alpha-olefin/maleic anhydride copolymer expressed by the formula (1) described above, or a mixture of the alpha-olefin/maleic anhydride copolymer and at least one of styrene/acrylic copolymers, water-soluble polyurethane resins and water-soluble polyester resins, the content of the humectant is 20 to 35% by mass in the recording ink, the solid content of the water-dispersible resin in the ink (A) and the solid content of the pigment in the water-dispersible colorant (B) satisfy a relation with respect to their ratio (A/B) of 2 to 8.

The recording ink of the second or third embodiment may afford superior image quality on regular paper particularly with no inkless void and with higher image density, color saturation, durability such as water resistance and lightfastness, and represents excellent drying property and beading on gloss paper, superior drying velocity and high-speed printing, and appropriate ejection stability from nozzles.

The inventive ink cartridge includes a container to house the inventive recording ink of the second or third embodiment. The ink cartridge may be appropriately utilized for printers etc. of ink-jet recording processes. The recording by use of the ink in the ink cartridge may bring about superior image quality on regular paper particularly with no inkless void and with higher image density, color saturation, durability such as water resistance and lightfastness, and may represent excellent drying property and beading on gloss paper, superior drying velocity and high-speed printing, and appropriate ejection stability from nozzles, thus images may be recorded with high clearness like printed matters.

The inventive ink-jet recording apparatus includes an ink electing unit that applies energy to the inventive recording ink of the second or third embodiment to record images through ejecting the recording ink. In the ink-jet recording apparatus, energy is applied to the inventive recording ink, and the inventive recording ink is ejected from nozzles, thereby recording images. Consequently, the recording may bring about superior image quality on regular paper particularly with no inkless void and with higher image density, color saturation, durability such as water resistance and lightfastness, and may represent excellent drying property and beading on gloss paper, superior drying velocity and high-speed printing, and appropriate ejection stability from nozzles, thus images may be recorded with high clearness like printed matters.

The inventive ink-jet recording method includes an ink electing step that applies energy to the inventive recording ink of the second or third embodiment to record images through ejecting the recording ink. In the ink-jet recording method, energy is applied to the inventive recording ink, and the inventive recording ink is ejected from nozzles, thereby recording images. Consequently, the recording may bring about superior image quality on regular paper particularly with no inkless void and with higher image density, color saturation, durability such as water resistance and lightfastness, and may represent excellent drying property and beading on gloss paper, superior drying velocity and high-speed printing, and appropriate ejection stability from nozzles, thus images may be recorded with high clearness like printed matters.

The inventive ink recorded matter includes on a recording medium an image formed by the inventive recording ink of the second or third embodiment. The ink recorded matter on regular paper may be with no inkless void and with higher image density, color saturation, durability such as water resistance and lightfastness, and may represent excellent drying property and beading on gloss paper, superior drying velocity and high-speed printing, and appropriate ejection stability from nozzles, thus images may be recorded on the recording medium with high clearness like printed matters.

BEST MODE FOR CARRYING OUT THE INVENTION

Pigment Dispersion

Figure 1:
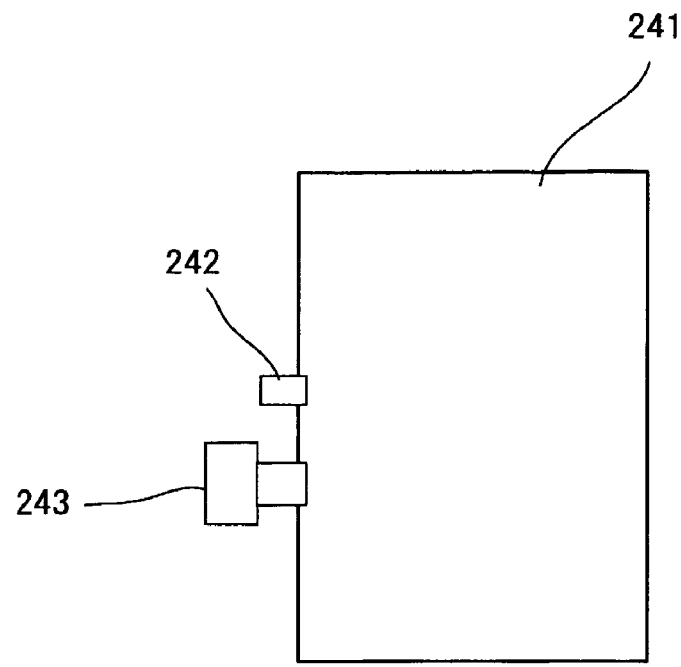
FIG. 1 is a schematic exemplary view of an ink cartridge according to the present invention.

The pigment dispersion according to the present invention includes a pigment, a pigment dispersant, a polymer dispersion stabilizer, and water, and also other optional ingredients as required.

Polymer Dispersion Stabilizer

The polymer dispersion stabilizer may be alpha-olefin/maleic anhydride copolymers expressed by the structural formula (1) shown below.

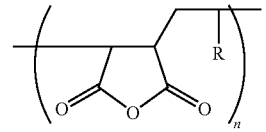

Formula (1)

In the structural formula (1), R represents an alkyl group of which the carbon-atom number is preferably 6 to 25, more preferably 6 to 22, and the alkyl group may be of linear chain, branched chain or cyclic; n is an integer of 30 to 100.

The alpha-olefin/maleic anhydride copolymers expressed by the structural formula (1) are typically, at room temperature, a solid and can hardly dissolve into water at all. The alpha-olefin/maleic anhydride copolymers are effective to stabilize pigment dispersions in which pigments are uniformly finely dispersed into water. The effect for stabilizing the dispersions is significant when the alpha-olefin/maleic anhydride copolymers are dissolved in an alkaline or alkaline aqueous solution in a condition that the alkaline quantity of the alkaline or alkaline aqueous solution is no less than the alkaline quantity corresponding to the acid value of the alpha-olefin/maleic anhydride copolymer.

The alpha-olefin/maleic anhydride copolymers can be easily dissolved into alkaline or alkaline aqueous solutions under heating and stirring. In some cases where the olefin chain of the copolymers is relatively long, it may be difficult to dissolve the copolymers and thus insoluble matters may remain in the solutions; in such cases, the copolymers may be effectively utilized through merely removing the insoluble matters using a filter etc.

Examples of the bases in the alkaline or alkaline aqueous solutions include alkaline metal hydroxides such as sodium hydroxide, potassium hydroxide and lithium hydroxide; basic substances such as ammonia, triethylamine and morpholine; alcohol amines such as triethanolamine, diethanolamine, N-methyl diethanolamine, 2-amino-2-ethyl-1,3-propanediol and choline.

The acid value of the alpha-olefin/maleic anhydride copolymers is preferably 100 to 400 mgKOH/g, more preferably 100 to 350 mgKOH/g. When the acid value is below 100 mgKOH/g, the solubility may be insufficient in the alkaline solutions, and when the acid value is above 400 mgKOH/ g, ink-ejection may be disturbed due to higher viscosities of dispersions or dispersion stability may be degraded.

The mass average molecular weight of the alpha-olefin/maleic anhydride copolymers is preferably 5000 to 20000. When the mass average molecular weight is less than 5000, the dispersion stability of pigment dispersions may be lowered, and when the mass average molecular weight is more than 20000, the solubility may be insufficient in alkaline solutions or the viscosity may be inappropriately higher.

The polymer dispersion stabilizer may be properly synthesized or commercially available; examples of those include T-YP110, T-YP111, T-YP112 and T-YP113 (by Seico PMC Co.).

The amount of the polymer dispersion stabilizers is preferably 1 to 100 parts by mass based on 100 parts by mass of pigments on the basis of solid content, more preferably 5 to 50 parts by mass. When the amount is less than 1 part by mass, the effect of dispersion stabilization may be negligible, and when the amount is more than 100 parts by mass, ink-ejection may be blocked due to higher viscosities, or the cost may be higher.

Pigment

The pigment is preferably a complex pigment which is formed of organic or inorganic pigment particles coated with an organic pigment or carbon black. The complex pigment may be produced by depositing an organic pigment or carbon black on inorganic pigment particles, or by mechanochemically mixing and abrading an inorganic pigment and an inorganic pigment or a carbon black. The adhesion between the organic pigment and the inorganic pigment may be enhanced by disposing a layer of polysiloxanes or organosilane compounds formed from alkylsilanes therebetween as required.

Examples of organic pigment include aniline black as a black pigment; anthraquinone, phthalocyanine blue, phthalocyanine green, diazo- or monoazo yellow pigment, disazo yellow pigment, pyranthoron, perylene, heterocyclic yellow, quinacridone, (thio)indigo as color pigments, and the like. Among these, phthalocyanine pigments, quinacridone pigments, monoazo yellow pigments, disazo yellow pigments and heterocyclic yellow pigments are especially preferable in terms of color developing ability.

Examples of phthalocyanine pigments include copper phthalocyanine blue and derivatives thereof (C.I. pigment blue 15:3, 15:4), aluminum phthalocyanine, and the like.

Examples of quinacridone pigments include C.I. pigment orange 48, C.I. pigment orange 49, C.I. pigment red 122, C.I. pigment red 192, C.I. pigment red 202, C.I. pigment red 206, C.I. pigment red 207, C.I. pigment red 209, C.I. pigment violet 19, C.I. pigment violet 42, and the like.

Examples of monoazo yellow pigments include C.I. pigment yellow 74, C.I. pigment yellow 109, C.I. pigment yellow 128, C.I. pigment yellow 151, and the like.

Examples of disazo yellow pigments include C.I. pigment yellow 14, C.I. pigment yellow 16, C.I. pigment yellow 17, and the like.

Examples of heterocyclic yellow pigments include C.I. pigment yellow 117, C.I. pigment yellow 138, and the like.

Other coloring pigments may be found in "The Color Index, third edition, by Society of Dyers and Colorists (1982)".

Examples of the inorganic particles include those of titanium dioxide, silica, alumina, iron oxide, iron hydroxide, tin oxide etc. These may be used alone or in combination.

It is preferred that the organic pigment particles have a particle shape of lower aspect ratios, most preferably are spherical. The color of the inorganic pigment particles is preferably transparent or white in cases where the pigment is to be colored, and black inorganic pigments are allowable in cases where a black colorant is to be deposited. The primary particle size of the inorganic pigment particles is preferably no more than 100 nm, more preferably 5 to 50 nm.

The mass ratio of the inorganic pigment particles to the organic pigment or carbon black as a color material, i.e. inorganic pigment particles: color material, is preferably 3:1 to 1:3 and more preferably 3:2 to 1:2. When the mass ratio of the color material is small, color developing ability or coloring power may be deteriorated, and when the amount of the color material excessively higher, transparency or color tones may be deteriorated.

Examples of color particles, in which inorganic pigment particles being coated with an organic pigment or carbon black, include composite materials such as silica/carbon black composite materials, silica/phthalocyanine C.I.PB 15:3 composite material, silica/disazo yellow composite material and silica/quinacridone C.I. PR122 composite material (by Toda Kogyo Co.). The primary particle diameters of these materials are sufficiently small for favorable use.

When inorganic pigment particles with a primary particle diameter of 20 nm are coated with an equivalent amount of organic pigment, the primary particle diameter of this pigment should become about 25 nm. When these pigments can be dispersed into their primary particles using an appropriate dispersant, an extremely fine pigment-dispersed ink can be produced with a dispersing particle diameter of 25 nm. In these complex pigments, not only the organic pigment on the surface affects the dispersion but also the properties of the central inorganic pigment appear through the thin layer 2.5 nm thick, the selection of the pigment dispersant should be based on both the organic and inorganic pigments.

The colorant pigment particles, in the present invention, may be surface-treated with carboxyl, carbonyl, sulfonic, hydroxyl group, or the like to turn into hydrophilic, then aqueous dispersion thereof may be utilized. The process of surface treatment may be conventional ones such as oxidization treatment, azo reaction and plasma treatment.

Pigment Dispersant

The pigment dispersants for dispersing the organic pigments or complex pigments are preferably anionic surfactants or nonionic surfactants with an HLB value of 10 to 20.

Examples of anionic surfactants include polyoxyethylene alkylether acetates, alkylbenzene sulfonates (e.g. $NH_4$, Na, Ca), alkyldiphenylether disulfonates (e.g. $NH_4$, Na, Ca), dialkylsuccinate sodium sulfonates, naphthalenesulfonic acid formalin condensate sodium salts, polyoxyethylene polycyclic phenylether sulfonate salts (e.g. $NH_4$, Na), lauric acid salts, polyoxyethylene alkylether sulfonate salts and oleate salts. Among these, dioctylsulfosuccinate Na salt and polyoxyethylene styrenephenylether sulfonate $NH_4$ salt are preferable in particular.

Examples of the nonionic surfactants with an HLB value of 10 to 20 include polyoxyethylene alkylether, polyoxyalkylene alkylether, polyoxyethylene polycyclic phenylether, sorbitan fatty ester, polyoxyethylene sorbitan fatty ester, polyoxyethylene alkylphenyl ether, polyoxyethylene alkylamine, polyoxyethylene alkylamide, and acetylene glycol. Among these, polyoxyethylene laurylether, polyoxyethylene beta-naphthylether, polyoxyethylene sorbitan monooleate, and polyoxyethylene styrenephenylether are preferable in particular.

The pigment dispersion in the present invention may be produced by the processes using apparatuses such as homogenizers for high-speed stirring, ball-dispersion kneaders such as a bead mill and ball mill, shear-dispersion kneaders such as a roll mill, and an ultrasonic disperser, after a dispersant is dissolved in an aqueous medium to prepare a solution to which the organic or complex pigment is then added and moistened sufficiently followed by adding the polymer dispersant. After the mixing and dispersing processes, there often exist coarse particles in the resulting dispersion, thus it is typically required to remove the coarse particles of above 1 μm diameter using a filter or centrifugal separator in order to prevent blockings of production lines.

The amount of the dispersant is preferably 1 to 100 parts by mass based on 100 parts by mass of the pigment, more preferably 10 to 50 parts by mass. When the amount of the dispersant is insufficient, the pigment may not be sufficiently micronized, and when the amount is excessive, the excessive dispersant non-adsorbed onto pigments tends to affect ink properties, resulting in image bleeding or deterioration of water and/or scratch resistance.

The pigment dispersions according to the present invention may exhibit superior pigment-dispersion stability under long-term storage, and thus may be favorably utilized as colorants etc. in various applications, in particular colorants of ink-jet recording inks explained below.

Recording Ink

Recording Ink of First Embodiment

The recording ink in the first embodiment according to the present invention includes the pigment dispersion according to the present invention, a surfactant, a water-dispersible resin, a humectant, and water, and also other optional ingredients such as a wetting agent, a pH-adjuster and the like as required.

The average particle diameter $D_{50}$ of the inventive pigment dispersion of colorant is preferably no more than 150 nm in the recording inks, more preferably no more than 100 nm. When the average particle diameter $D_{50}$ is above 150 nm, the ejection stability may be degraded remarkably, resulting possibly in nozzle clogging or ink-ejection deviation. When the average particle diameter $D_{50}$ is no more than 100 nm, the ejection stability may be promoted and also color saturation may be improved.

The amount of the pigment dispersion is preferably 2 to 15% by mass in the recording ink on the basis of solid content, more preferably 3 to 10% by mass. When the amount is below 2% by mass, color development and image density of the ink may be significantly lowered, and when the amount is above 15% by mass, the ink viscosity may rise excessively to deteriorate the ejection condition, and also the production cost may rise.

Recording Ink of Second and Third Embodiments

The recording inks in the second or third embodiment according to the present invention include a water-dispersible colorant, a water-dispersible resin, a humectant, and water, and also other optional ingredients such as a surfactant, a wetting agent and the like as required.

In the second embodiment of the recording ink, the water-dispersible colorant is a pigment dispersion that contains a pigment, a pigment dispersant, and a polymer dispersion stabilizer; in the third embodiment of the recording ink, the water-dispersible colorant is a pigment dispersion that contains a self-dispersible pigment and a polymer dispersion stabilizer.

In the recording ink according to the present invention, the ratio of A/B in a range of 2 to 8 may increase the fixing ability and improve the color development, in which A is a solid content of the water-dispersible resin in the recording ink and B is a solid content of the pigment in the water-dispersible colorant in the recording ink. The fixing ability and the color development may be improved along with raising the solid content of water-dispersible resins to e.g. three or four times of the solid content of pigments, and the effect to enhance image density tends to saturate at around more than eight times, therefore the ratio of A/B in the range of 2 to 8 is preferable in view of production cost still. The total content of the water-dispersible colorant and the water-dispersible resin is preferably 12 to 40% by mass based on the entire weight of the recording ink, more preferably 15 to 35% by mass. When the content is below 12% by mass, the drying ability may be poor on paper surface, possibly resulting in degradation of letter-image quality on regular paper, and when the content is above 40% by mass, the ink may easily dry at nozzle face, possibly resulting in inferior ejection.

The solid contents of the colorant and the water-dispersible resin may be measured through separating exclusively the colorant or the water-dispersible resin from the ink. In cases where pigments are employed as the colorant, the ratio of the colorant to the water-dispersible resin can be determined through measuring weight loss by thermogravimetric analysis. In cases where molecular structure of the colorant is definite, the solid content of the colorant can be determined by NMR, fluorescent X-ray analysis or the like.

Water-Dispersible Colorant

The water-dispersible colorant in the second embodiment is a pigment dispersion that contains a pigment, a pigment dispersant and a polymer dispersion stabilizer.

The water-dispersible colorant in the third embodiment is a pigment dispersion that contains a pigment and a polymer dispersion stabilizer, in which the pigment has at least a hydrophilic group on the surface and is a self-dispersible pigment that is water-dispersible and/or water-soluble in the absence of dispersant.

The polymer dispersion stabilizer may be one of alpha-olefin/maleic anhydride copolymers expressed by the formula (1) below or a mixture of at least one of the alpha-olefin/maleic anhydride copolymers and at least one of styrene/acrylic copolymers, water-soluble polyurethane resins and water-soluble polyester resins.

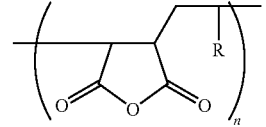

Formula (1)

In the formula (1), R represents an alkyl group of which the carbon-atom number is preferably 6 to 25, more preferably 6 to 22; n is an integer of 30 to 100.

The alpha-olefin/maleic anhydride copolymers expressed by the formula (1) may be properly synthesized or commercially available; examples, thereof include T-YP112, T-YP114, T-YP115 and T-YP116 (by Seico PMC Co.).

The water-soluble polyurethane resins may be commercially available ones; examples thereof include Takelac W-5025, Takelac W-6010, Takelac W-5661, etc. (by Mitsui Takeda Chemical Co.).

The water-soluble polyester resins may be commercially available ones; examples thereof include Nichigo Polyester W-0030, Nichigo Polyester W-0005S30WO, Nichigo Polyester WR-961 (by Nippon Synthetic Chemical Industries, Co.), Pesresin A-210, Pesresin A-520 (by Takamatsu Yusi Co.), etc.

In cases where at least one of alpha-olefin/maleic anhydride copolymers (A) and at least one of styrene/acrylic copolymers, water-soluble polyurethane resins and water-soluble polyester resins (B) are mixed, the mixing ratio (A:B) is preferably 10:90 to 90:10.

The solid content of the polymer dispersion stabilizers is preferably 1 to 100 parts by mass based on 100 parts by mass of the pigments, more preferably 5 to 50 parts by mass. When the solid content is below 1 part by mass, the effect to stabilize dispersion may be negligible, and when more than 100 parts by mass, ink-ejection may be blocked due to higher viscosities and/or the cost may be higher.

Pigment

The pigment may be organic or inorganic. The pigment may contain a dye in order to arrange the color tone as long as the durability being maintained.

Examples of the inorganic pigments include titanium oxide, iron oxide, calcium carbonate, barium sulfate, aluminum hydroxide, barium yellow, cadmium red, chromium yellow, and carbon black; among these, carbon black etc. is preferable. The carbon black may be those produced by the publicly known methods such as a contact method, furnace method and thermal method.

The organic pigments include azo pigments, polycyclic pigments, dye chelates, nitro pigments, nitroso pigments, and aniline black. Among these, azo pigments and polycyclic pigments are preferable. Examples of the azo pigments include azo lakes, insoluble azo pigments, condensed azo pigments, and chelate azo pigments. The polycyclic pigments include phthalocyanine pigments, perylene pigments, perinone pigments, anthraquinone pigments, quinacridone pigments, dioxadine pigments, indigo pigments, thioindigo pigments, isoindolinone pigments and quinophtalone pigments. Examples of the dye chelates include basic dye chelates and acidic dye chelates.

The color of the colorants may be properly selected depending on the purpose; for example, the color may be achromatic or chromatic. The colorant may be used alone or in combination of two or more.

Examples of achromatic colorants include carbon black (C.I. pigment black 7) such as furnace black, lamp black, acetylene black and channel black; metal oxides such as copper oxide, iron oxide (C.I. pigment black 11) and titanium oxide; organic pigments such as aniline black (C.I. pigment black 1).

Examples of chromatic colorants include C.I. pigment yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, 183; C.I. pigment orange 5, 13, 16, 17, 36, 43, 51; C.I. pigment red 1, 2, 3, 5, 17, 22, 23, 31, 38, 48:2, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, 2.19; C.I. pigment violet (rhodamine lake), 3, 5:1, 16, 19, 23, 38; C.I. pigment blue 1, 2, 15 (phthalocyanine blue) 15:1, 15:2, 15:3 (phthalocyanine blue), 16, 17:1, 56, 60, 63; C.I. pigment green 1, 4, 7, 8, 10, 17, 18, 36.

The self-dispersible pigments, utilized for the recording ink of the third embodiment, are surface-modified ones such that at least a hydrophilic group bonds directly or through another atomic group to the surface of the pigments. The surface-treatment may be carried out by way of chemically bonding a certain functional group such as sulfonic group and carboxyl group to the surface of pigments or wet-oxidizing pigments with hypohalous acids or their salts. Particularly preferable are water-dispersible pigments to which surface the carboxyl group bonds. Such surface-treatment with carboxyl group may improve dispersion stability, provide high-quality printing and increase water resistance of recorded matters after printing.

In addition, such inks may exhibit superior re-dispersibility even once dried, therefore there occurs substantially no clogging of nozzles even after a long-term rest and thus moisture of the ink around ink-jet head nozzles has evaporated, and then proper printing may regenerate after simple cleaning.

Preferably, the self-dispersible pigments have a volume average particle diameter of 0.01 to 0.16 μm in inks.

Preferably, the self-dispersible carbon blacks exhibit ionic properties, more preferably, have an anionic or cationic charge.

Examples of the anionic hydrophilic groups include —COOM, —SO$_3$M, —PO$_3$HM, —PO$_3$M$_2$, —SO$_2$NH$_2$, and —SO$_2$NHCOR, in which M represents one of hydrogen atom, alkaline metals, ammonium, and organic ammoniums, R represents one of alkyl, groups having a carbon-atom number of 1 to 12, phenyl groups which may be substituted by a substituent, and naphthyl groups which may be substituted by a substituent. Among these, preferable are color pigments to which surface —COOM or —SO$_3$M bonds.

M of alkaline metals in the hydrophilic group includes, for example, lithium, sodium and potassium. Examples of the organic ammoniums include mono- or tri-methyl ammonium, mono- or tri-ethyl ammonium, mono or tri-methanol ammonium, and the like. As for the methods for producing the anionically charged color pigments, —COONa may be introduced on the surface of color pigments by way of, for example, oxidization-treating color pigments using sodium hypochlorite, sulfonating, or reacting with a diazonium salt.

The cationic hydrophilic groups are preferably quaternary ammonium groups, more preferably the quaternary ammonium groups shown below. Carbon blacks, to which at least one of these groups attaches, are preferable colorant in the present invention.

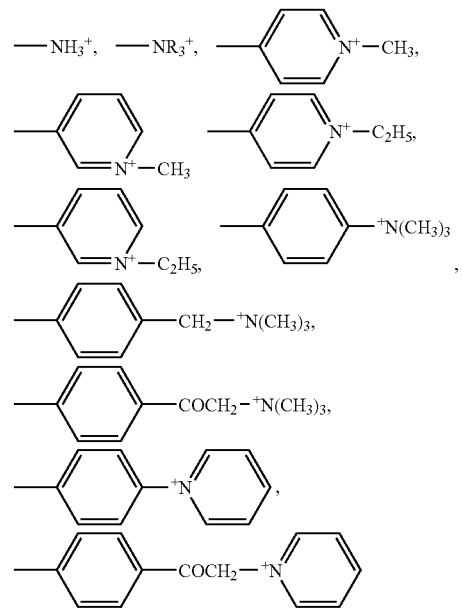

The cationic self-dispersible carbon blacks, to which hydrophilic groups bond, may be properly produced depending on the application; for example, N-ethylpyridyl group shown below can be attached to carbon black through treating with 3-amino-N-ethylpyridinium bromide.

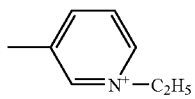

The hydrophilic groups may be attached to the surface of carbon black through another atomic group. The another atomic group may be alkyl groups having a carbon-atom number of 1 to 12, phenyl groups which may be substituted by a substituent, and naphthyl groups which may be substituted by a substituent. Specific examples of the hydrophilic groups and another atomic groups attached to the surface of carbon black are —$C_2H_4COOM$ (M: one of alkaline metals and quaternary ammoniums), -$PhSO_3M$ (Ph: phenyl group, M: one of alkaline metals and quaternary ammoniums), and —$C_5H_{10}NH_3^+$.

Conventional organic pigments or inorganic pigment particles may be coated with organic pigments or carbon blacks to prepare complex pigments, and may be appropriately utilized in the present invention. The methods for producing these complex pigments may be, for example, deposition of organic pigments on inorganic pigment particles or mechanochemical processes by mechanically mixing and milling organic and inorganic pigments. A layer of organosilane compounds, synthesized from polysiloxanes and alkylsilanes, may be disposed between the organic and inorganic pigments to strengthen the adhesion therebetween as required.

Examples of organic pigment include aniline black as black pigment; anthraquinone, phthalocyanine blue, phthalocyanine green, diaso, monoazo, pyranthoron, perylene, heterocyclic yellow, quinacridone, (thio)indigo as color pigment. Among these, carbon blacks, phthalocyanine pigments, quinacridone pigments, monoazo yellow pigments, disazo yellow pigments and heterocyclic yellow pigments are especially preferable in terms of color developing ability.

Examples of phthalocyanine blue include copper phthalocyanine blue and derivatives thereof (C.I. pigment blue 15:3, 15:4), aluminum phthalocyanine, and the like. Examples of quinacridone pigments include C.I. pigment orange 48, C.I. pigment orange 49, —C.I. pigment red 122, C.I. pigment red 192, C.I. pigment red 202, C.I. pigment red 206, C.I. pigment red 207, C.I. pigment red 209, C.I. pigment violet 19, C.I. pigment violet 42, and the like. Examples of monoazo yellow pigments include C.I. pigment yellow 74, C.I. pigment yellow 109, C.I. pigment yellow 128, C.I. pigment yellow 151, and the like. Examples of disazo yellow pigments include C.I. pigment yellow 14, C.I. pigment yellow 16, C.I. pigment yellow 17, and the like. Examples of heterocyclic yellow pigments include C.I. pigment yellow 117, C.I. pigment yellow 138, and the like. Other coloring pigments may be found in "The Color Index, third edition, by The Society of Dyers and Colorists (1982)".

The inorganic pigments may be exemplified by titanium dioxide, silica, alumina, iron oxide, iron hydroxide, and tin oxide; the particle shape is preferably of lower aspect ratios, most preferably spherical. The color of the inorganic pigments is preferably transparent or white in cases where chromatic colorants are to be adsorbed, and may be black in cases where black colorants are to be adsorbed. The primary particle diameter of the organic pigment particles is preferably no more than 100 nm, more preferably 5 to 50 nm.

The mass ratio of the inorganic pigment particles to the organic pigments or carbon blacks as a color material, i.e. inorganic pigment particles: colorants, is preferably 3:1 to 1:3 and more preferably 3:2 to 1:2. In cases where the mass ratio of colorants is relatively low, color developing ability or tinting strength may be poor, and in cases where the mass ratio of colorants is relatively high, transparency or color tones may be deteriorated.

Examples of colorant particles in which inorganic pigment particles being coated with organic pigments or carbon blacks include composite materials by Toda Kogyo Corporation such as silica/carbon black composite material, silica/phthalocyanine C.I. PB15:3 composite material, silica/disazo yellow composite material, silica/quinacridone C.I. PR122 composite material, and the like; the primary particle diameters of these products are sufficiently small to be employed.

When inorganic pigment particles with a primary particle diameter of 20 nm are coated with an equivalent amount of organic pigment, the primary particle diameter of this pigment should become about 25 nm. When these pigments can be dispersed into their primary particles using an appropriate dispersant, an extremely fine pigment-dispersed ink can be produced with a dispersing particle diameter of 25 nm. In these complex pigments, not only the organic pigment on the surface affects the dispersion but also the properties of the central inorganic pigment appear through the thin layer 2.5 nm thick, the selection of the pigment dispersant should be based on both the organic and inorganic pigments.

Pigment Dispersant

The colorants in the second embodiment contain a pigment dispersant. The pigment dispersant is preferably one of anionic surfactants and nonionic surfactants having an HLB value of 10 to 20.

Specific examples of the anionic surfactants include polyoxyethylenealkylether acetate, alkylbenzene sulfonate (e.g. $NH_4$, Na, Ca), alkyldiphenylether disulfonate (e.g. $NH_4$, Na, Ca), dialkylsuccinate sodium sulfonates, naphthalenesulfonic acid formalin condensate sodium salts, polyoxyethylene polycyclic phenylether sulfonate salts (e.g. $NH_4$, Na), lauric acid salts, polyoxyethylene alkylether sulfonate salts and oleate salts. Among these, dioctylsulfosuccinate Na salt and polyoxyethylene styrenephenylether sulfonate $NH_4$ salts are preferable in particular.

Examples of the nonionic surfactants with an HLB value of 10 to 20 include polyoxyethylene alkylether, polyoxyalkylene alkylether, polyoxyethylene polycyclic phenylether, sorbitan fatty ester, polyoxyethylene sorbitan fatty ester, polyoxyethylene alkylphenyl ether, polyoxyethylene alkylamine, polyoxyethylene alkylamide, and acetylene glycol. Among these, polyoxyethylene laurylether, polyoxyethylene beta-naphthylether, polyoxyethylene sorbitan monooleate, and polyoxyethylene styrenephenylether are preferable in particular.

The amount of the dispersants is preferably 1 to 100 parts by mass based on 100 parts by mass of the pigments, more preferably 10 to 50 parts by mass. When the amount of the dispersant is insufficient, the pigment may not be sufficiently micronized, and when the amount is excessively high, the excessive dispersant non-adsorbed onto pigments tends to affect ink properties, resulting in image bleeding or deterioration of water and scratch resistance.

The pigment dispersion may be produced by the process using apparatuses such as homogenizers for high-speed stirring, ball-dispersion kneaders such as a bead mill and ball mill, shear-dispersion kneaders such as a roll mill, and ultrasonic dispersers, after the organic dispersant is dissolved in an aqueous medium to prepare a solution to which the pigment is then added and moistened sufficiently followed by adding the polymer dispersant. After the mixing and dispersing processes, there often exist coarse particles in the resulting dispersion, thus it is typically required to remove the coarse particles of above 1 μm diameter using a filter or centrifugal separator in order to prevent blockings of production lines.

The average particle diameter $D_{50}$ of pigment dispersions is preferably no more than 150 nm in the recording inks, more preferably no more than 100 nm. When the average particle diameter $D_{50}$ is above 150 nm, the ejection stability may worsen remarkably, resulting possibly in nozzle clogging or ink-ejection deviation. When the average particle diameter $D_{50}$ is no more than 100 nm, the ejection stability may be promoted and color saturation may be improved.

The amount of the pigment dispersions is preferably 2 to 15% by mass in the entire recording inks on the basis of solid content, more preferably 3 to 12% by mass. When the amount is below 2% by mass, color development and image density may be significantly lowered, and when the amount is above 15% by mass, the ink viscosity may rise excessively to deteriorate the ejection condition, and also the production cost may rise.

Common Ingredients of Recording Inks of First to Third Embodiments

Surfactant

It is preferred that the surfactant is one of silicone surfactants and fluorine-containing surfactants, provided that the surfactant preferably leads, to lower surface tension and higher leveling ability, and does not diminish dispersion stability in combination with other colorants or humectants; in particular, fluorine-containing surfactants are preferable.

It is preferred that the fluorine-containing surfactants contain 2 to 16 carbon atoms, to which fluorine atoms being bonded, per molecule, more preferably 4 to 16 carbon atoms. In cases where the carbon atoms to which fluorine atoms being bonded is less than 2, the effect of fluorine atom may be negligible, and in cases where more than 16, the ink-storage stability may be lower.

Examples of the fluorine-containing surfactants include perfluoroalkyl sulfonic acid compounds, perfluoroalkyl carboxylic acid compounds, perfluoroalkyl phosphate ester compounds, perfluoroalkyl ethyleneoxide adducts, and polyoxyalkylene ether polymer compounds having a perfluoroalkylether group in their side chains. Among these, the polyoxyalkylene ether polymer compounds having a perfluoroalkylether group in their side chains are particularly preferable in view of lower foaming property.

Examples of the perfluoroalkyl sulfonic acid compounds include perfluoroalkyl sulfonic acid and perfluoroalkyl sulfonate salts; examples of the perfluoroalkyl carboxylic compounds include perfluoroalkyl carboxylic acid and perfluoroalkyl carboxylate salts.

The perfluoroalkyl phosphate ester compounds include, for example perfluoroalkyl phosphate ester and perfluoroalkyl phosphate ester salts.

Examples of the polyoxyalkylene ether polymer compounds having a perfluoroalkyl ether group in their side chains include polyoxyalkylene ether polymer having a perfluoroalkyl ether group in the side chains, sulfate ester salts of polyoxyalkylene ether polymer having a perfluoroalkyl ester group in the side chains and salts of polyoxyalkylene ether polymer having a perfluoroalkyl ether group in the side chains.

Counter ions of the salts in these fluorine-containing surfactants include Li, Na, K, $NH_4$, $NH_3CH_2CH_2OH$, $NH_2(CH_2CH_2OH)_2$ and $NH(CH_2CH_2OH)_3$.

The fluorine-containing surfactants may be appropriately synthesized or commercially available.

Examples of the commercially available ones include Surflon S-111, S-112, S-113, S-121, S-131, S-132, S-141, S-145 (by Asahi Glass Co., Ltd.), Fullard FC-93, FC-95, FC-98, FC-129, FC-135, FC-170C, FC-430, FC-431 (by Sumitomo 3M Ltd.), Megafac F-470, F1405, F-474 (by Dainippon Ink And Chemicals, Inc.), Zonyl TBS, FSP, FSA, FSN-100, FSN, FSO-100, FSO, FS-300, UR (by DuPont), FT-110, FT-250, FT-251, FT-400S, FT-150, FT-400SW (by Neos Co.) and PF-151N (by Omnova Inc.). Among these, FT-110, FT-250, FT-251, FT-400S, FT-150, FT-400SW (by Neos Co.) and PF-151N (by Omnova Inc.) are particularly preferable in view of proper printing quality, in particular color development and uniform-coloring property on paper.

Specific examples of the fluorine-containing surfactants are those represented by the following formulas.

(1) Anionic Fluorine-Containing Surfactant

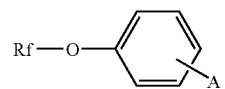

In the above formula, Rf represents a mixture of fluorine-containing hydrophobic groups represented by the following formulas; A represents $—SO_3X$, $—COOX$ or $—PO_3X$ (X is a counter anion, specifically hydrogen atom, Li, Na, K, $NH_4$, $NH_3CH_2CH_2OH$, $NH_2(CH_2CH_2OH)_2$, or $NH(CH_2CH_2OH)_3$).

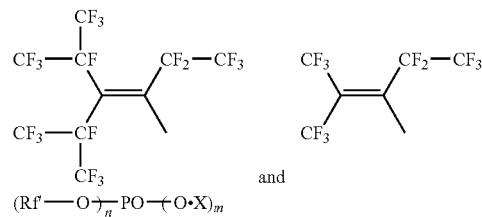

In the above formula, Rf' is a fluorine-containing group represented by the following formula; X is substantially the same as above, n represents an integer of 1 or 2, and m represents 2-n.

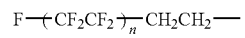

In the above formula, n represents an integer of 3 to 10.

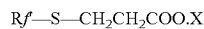

In the above formula, Rf' and X are substantially the same as defined above.

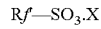

In the above formula, Rf' and X are substantially the same as defined above.

(2) Nonionic Fluorine-Containing Surfactant

In the above formula, Rf is substantially the same as defined above, and n represents an integer of 5 to 20.

In the above formula, Rf' is the same as defined above, and n represents an integer of 1 to 40.

(3) Ampholytic Fluorine-Containing Surfactant

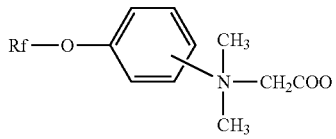

In the above formula, Rf is substantially the same as defined above.

(4) Oligomer-Type Fluorine-Containing Surfactant

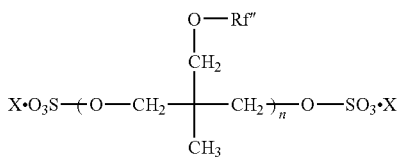

In the above formula, Rf'' represents a fluorine-containing group represented by the following formula, in which l represents an integer of 0 to 10 and X is substantially the same as defined above.

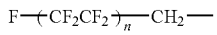

In the above formulas, n is an integer of 1 to 4.

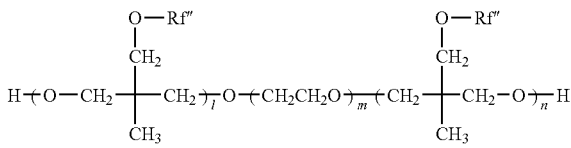

In the above formula, Rf'' is substantially the same as defined above; l, m, and n represent each an integer of 0 to 10.

The silicone surfactants may be appropriately selected depending on the purpose, preferably are those far from degradation at higher pH; examples thereof include polydimethylsiloxanes with modified side chains, polydimethylsiloxanes with modified both ends, polydimethylsiloxane with modified one end, and polydimethylsiloxane with modified side chains and both ends. The modifying group is preferably polyoxyethylene groups, polyoxyethylene polyoxypropylene groups or the like in view of appropriate properties as aqueous surfactants.

These surfactants may be appropriately synthesized or commercially available; examples thereof are those available from BYK Chemie GmbH, Shin-Etsu Silicones Co. Ltd., Dow Corning Tray Co. Ltd, or the like.

The polyether-modified silicone surfactants may be properly selected depending on the application, for example, may be the compounds expressed by the formula below in which polyalkyleneoxide units are introduced into Si-side chains of dimethylpolysiloxanes.

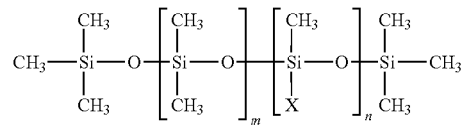

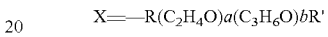

In the formula above, m, n, a and b represent each an integer; R and R' represent each an alkyl group or an alkylene group.

The polyether-modified silicone surfactants may be commercially available; examples thereof include KF-618, KF-642 and KF-643 (by Shin-Etsu Chemical Co.).

In addition to the fluorine-containing surfactants and silicone surfactants described above, anionic surfactants, nonionic surfactants, and ampholytic surfactants are employable as required.

Examples of the anionic surfactants include polyoxyethylene alkylether acetate salts, dodecylbenzene sulfonate salts, succinate ester sulfonate salts, lauryl acid salts, and salts of polyoxyethylene alkylether sulfate.

Examples of the nonionic surfactants include acetylene glycol surfactants, polyoxyethylene alkylethers, polyoxyethylene alkylphenylethers, polyoxyethylene alkylesters and polyoxyethylene sorbitan fatty acid esters.

Specific examples of acetylene glycol surfactants described above includes 2,4,7,9-tetramethyl-5-decine-4,7-diol, 3,6-dimethyl-4-octine-3,6-diol and 3,5-dimethyl-1-hexine-3-ol. The acetylene glycol surfactants may be commercially available, for example, Surfynol 104, 82, 465, 485, and TG supplied (by Air Products Co., USA).

Specific examples of the ampholytic surfactants described above include lauryl aminopropionate salts, lauryl dimethylbetaine, stearyl dimethylbetaine, lauryl dihydroxyethylbetaine, lauryl dimethylamine oxide, myristyl dimethylamine oxide, stearyl dimethylamine oxide, dihydroxyethyllaurylamine oxide, polyoxyethylene palm oil alkyl dimethylamine oxide, dimethylalkyl(palm)betaine and dimethyllauryl betaine.

These surfactants may be commercially available products by, for example, Nikko Chemicals Co. Ltd., Nippon Emulsion Co. Ltd., Nippon Shokubai Co. Ltd., Toho Chemical Industry Co. Ltd., Kao Corporation, Adeka Co. Ltd., Lion Corporation, Aoki Oil Industrial Co. Ltd., and Sanyo Chemical Industries Ltd.

The surfactants described above may be used alone or in combination. There exist some instances where a surfactant hardly dissolves into an ink but dissolves easily with another ink and the resulting solution is stable with time.

The content of the surfactants is preferably 0.01 to 3.0% by mass, more preferably 0.5 to 2.0% by mass. When the content is less than 0.01% by mass, the effect to add the surfactants may be negligible, and when the content is more than 3.0% by mass, image density may be lower and/or show through may appear due to excessively high permeability into recording media.

Water-Dispersible Resin

The water-dispersible resin may be appropriately selected depending on the purpose from, for example, condensed synthetic resins, addition synthetic resins and natural polymer compounds.

Examples of the condensed synthetic resins include polyester resins, polyurethane resins, polyepoxy resins, polyamide resins, polyether resins and silicone resins. Examples of the addition synthetic resins include polyolefin resins, polystyrene resins, polyvinyl alcohol resins, polyvinyl ester resins, polyacrylic resins and unsaturated carboxylic acid resins. Examples of the natural polymer compounds include celluloses, rosins and natural rubbers.

The water-dispersible resin may be used in a form of homopolymers or copolymers, and be selected from single-phase type, core shell type, or power feed-type emulsions.

The water-dispersible resins may be those where the resin itself has a hydrophilic group and is self-dispersible or those where the resin itself has no dispersibility whereas the dispersibility is imparted by a surfactant or a resin with a hydrophilic group. Among these, ionomers of the polyester resin and polyurethane resin, and emulsions of resin particles obtained by emulsification/suspension polymerization of unsaturated monomers are preferable. In cases of emulsification polymerization of unsaturated monomers, the water-dispersible resin can be easily obtained because the resin emulsion is obtained by reacting in the water into which the unsaturated monomer, a polymerization initiator, and a surfactant, a chain transfer agent, a chelator and a pH adjuster have been added, and objective natures are easily made because the resin constitution is easily changed.

Examples of the unsaturated monomers include unsaturated carboxylic acids, (meth)acrylate ester monomers, (meth)acrylate amide monomers, aromatic vinyl monomers, vinyl cyan compound monomers, vinyl monomers, allyl compound monomers, olefin monomers, diene monomers, oligomers having unsaturated carbons. These may be used alone or in combination of two or more. Combination of these monomers may make possible to flexibly modify various properties, for example, polymerization reaction or graft reaction using an oligomer polymerization initiator may lead to modification of resin properties.

Examples of the unsaturated carboxylic acids include acrylic acid, methacrylic acid, itaconic acid, fumaric acid and maleic acid.

Examples of the monofunctional (meth)acrylate esters include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyl trimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate and acryloxyethyltrimethyl ammonium salts.

Examples of the multifunctional (meth)acrylate esters include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis(4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylol propane triacrylate, trimethylol ethane triacrylate, tetramethylol methane triacrylate, ditrimethylol tetraacrylate, tetramethylol methane tetraacrylate, pentaerythritol tetraacrylate and dipentaerythritol hexaacrylate.

Examples of the (meth)acrylate amide monomers include acrylamide, methacrylamide, N,N-dimethylacrylamide, methylenebisacrylamide and 2-acrylamide-2-methylpropane sulfonate.

Examples of the aromatic vinyl monomers include styrene, alpha-methylstyrene, vinyltoluene, 4-t-butylstyrene, chlorostyrene, vinyl anisole, vinyl naphthalene and divinyl benzene.

Examples of the vinylcyan monomers include acrylonitrile and methacrylonitrile.

Examples of the allyl monomers include allyl sulfonic acid and salts thereof, allylamine, allyl chloride, diallylamine and diallyldimethyl ammonium salts; examples of the olefin monomers include ethylene and propylene; examples of the diene monomers include butadiene and chloroprene.

Examples of the vinyl monomers include vinyl acetate, vinylidene chloride, vinyl chloride, vinyl ether, vinyl ketone, vinyl pyrrolidone, vinyl sulfonic acid and salts thereof, vinyl trimethoxysilane and vinyl triethoxysilane.

Examples of the oligomers having an unsaturated carbon include styrene oligomers having methacryloyl group, styrene-acrylonitrile oligomers having methacryloyl group, methyl methacrylate oligomers having methacryloyl group, dimethylsiloxane oligomers having methacryloyl group and polyester oligomers having acryloyl group.

As for the water-dispersible resins, molecular chains are likely to be disrupted by dispersion destruction or hydrolysis under strongly alkaline or acidic conditions. Thus pH thereof is preferably 4 to 12, preferably 6 to 11, and more preferably 7 to 9, particularly in view of miscibility with the water-dispersible coloring agent.

The average particle diameter $D_{50}$ of the water-dispersible resins is associated with the viscosity of dispersion liquids; that is, when compositions and solid contents are the same, the smaller is the particle diameter, the larger is the viscosity. As such, in order to prevent ink viscosity to become excessively higher, the average particle diameter $D_{50}$ of water-dispersible resins is preferably 50 nm or more. On the other hand, in cases where the particle diameter is as large as a few tens microns, the particle size larger than nozzle orifices of the ink-jet heads hinders the usage, or large particles even with a diameter smaller than nozzle orifices tend to impair ejection stability. Accordingly, the average particle diameter $D_{50}$ is preferably no larger than 200 nm, more preferably no larger than 150 nm.

The water-dispersible resins perform to fix the water-dispersible colorants onto paper surface, and preferably come to a film at ambient temperature so as to enhance the fixing property of the colorants. Thus, the minimum film-forming temperature (MFT) of the water-dispersible resins is 30° C. or below, more preferably 20° C. or below In addition, in cases where the glass transfer temperature of the water-dispersible resins is −40° C. or below, the resin films tend to be sticky and printed matters are possibly tacky, thus, the water-dispersible resins preferably have a glass transfer temperature of −30° C. or above.

The content of the water-dispersible resins in the recording inks is preferably 4 to 30% by mass in terms of solid content, more preferably 6 to 24% by mass.

Humectant

The recording ink according to the present invention involves water as a liquid medium and thus also a humectant in order to prevent drying of the ink and to improve dispersion stability. The humectant may provide favorable effects to improve solubility and to prevent inferior injection due to water evaporation.

The humectant may be properly selected depending on the application; examples thereof include polyvalent alcohols, polyvalent alcohol alkylethers, polyvalent alcohol arylethers, nitrogen-containing heterocyclic compounds, amides, amines, sulfur-containing compounds, propylene carbonate, ethylene carbonate and the like. These may be used alone or in combination.

Examples of the polyvalent alcohols include glycerin, diethylene glycol, 1,3-butanediol, 3-methyl-1,3-butanediol, triethylene glycol, propylene glycol, dipropylene glycol, trimethylol propane, trimethylol ethane, ethylene glycol, tripropylene glycol, tetraethylene glycol, hexylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, petriol, and the like.

Examples of the polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like. Examples of the polyvalent alcohol arylethers include ethylene glycol monophenyl ether, ethylene glycol monobenzyl ether, and the like.

Examples of the nitrogen-containing heterocyclic compounds include 2-pyrrolidone, N-methyl-2-pyrrolidone, N-hydroxyethyl-2-pyrrolidone, 1,3-dimethyl imidazoledione, epsilon-caprolactam, gamma-butyrolactone, and the like.

Examples of the amides include formamide, N-methyl formamide, N,N-dimethyl formamide, and the like.

Examples of the amines include monoethanol amine, diethanol amine, triethanol amine, monoethyl amine, diethyl amine, triethyl amine, and the like. Examples of the sulfur-containing compounds include dimethyl sulfoxide, sulfolane, thiodiethanol, and the like.

Other humectants are preferably those containing sugars; examples of the sugars include monomeric sugars, two sugars, oligosaccharides (including trisaccharide and tetrasaccharide) and polysaccharides. Specific examples include glucose, mannose, fructose, ribose, xylose, arabinose, galactose, maltose, cellobiose, lactose, sucrose, trehalose, malt triose, and the like. The polysaccharides are broadly defined herein as sugars, which encompass the substances broadly existing in natural world, such as alpha-cyclodextrin and cellulose. Derivatives of these sugars include reducing sugars of the above sugars such as sugar alcohols expressed by General Formula: $HOCH_2(CHOH)nCH_2OH$ where "n" represents an integer of 2 to 5; saccharides such as aldonic acid and uronic acid; amino acid, thio acid, and the like. Among these, sugar alcohols are preferable, and specific examples thereof include maltitol and sorbitol.

Among these humectants, glycerin, diethylene glycol, 1,3-butanediol, 3-methyl-1,3-butanediol, triethylene glycol, 1,6-hexanediol, propylene glycol, 1,5-pentanediol, dipropylene glycol and trimethylol propane are particularly preferable in view of storage and discharge stability.

The mass ratio of the pigments to the humectants significantly affects the ink discharge stability from ink heads. When the amount of humectants is insufficient compared to solid content of pigments, water evaporation near the ink meniscus of nozzles may result in discharge failure.

The content of humectants is preferably 10 to 50% by mass and in the recording inks, more preferably 15 to 35% by mass, still more preferably 22.5 to 32.5% by mass. The recording inks within this range may advantageously afford drying, storage, and reliability items. When the content is less than 10% by mass, the inks tend to rapidly dry at nozzle faces possibly to cause inferior ejection, meanwhile when the content is more than 50% by mass, the drying velocity is lower on paper surface, which may also impair printing quality of characters on regular paper.

Wetting Agent

The wetting agents preferably contain at least a polyol compound whose solubility is 0.2 to 5.0% by mass in water at 20° C. Examples of the polyol compounds include aliphatic diols such as 2-ethyl-2-methyl-1,3-peopanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol and 2-ethyl-1,3-hexanediol. Among these, 2-ethyl-1,3-hexanediol and 2,2,4-trimethyl-1,3-pentanediol are particularly preferable.

The other wetting agents suited to simultaneous use may be properly selected as long as capable of adjusting desirable physical properties; examples thereof include alkyl or allyl ethers of polyhydric alcohols such as diethyleneglycol monophenylether, ethyleneglycol monophenylether, ethyleneglycol monoallylether, diethyleneglycol monophenylether, diethyleneglycol monobutylether, propyleneglycol monobutylether and tetraethyleneglycol chlorophenylether; and lower alcohols such as ethanol.

The content of the wetting agents in the inks is preferably 0.1% by mass to 4.0% by mass. When the content is less than 0.1% by mass, drying speed may be lower, thus possibly resulting in bleeding of images, and when the content is more than 4.0% by mass, dispersion stability of the colorants may degrade, nozzle clogging tends to easily occurs, and image density tends to decrease or show through tends to occur due to excessively higher permeability into recording media.

pH Adjuster

The pH adjusters may be properly selected as long as giving no adverse effect on recording inks and able to adjust pH within 7 to 11; examples thereof include alcohol amines, alkali metal hydroxides, ammonium hydroxides, phosphonium hydroxides and alkali metal carbonates. In cases where the pH exceeds 11, the materials of ink-jet heads and/or ink-supply units may be dissolved, and such troubles may occur as degradation or leakage of inks, inferior ink-ejection, or the like.

Examples of the alcohol amines include diethanolamine, triethanolamine and 2-amino-2-ethyl-1,3-propanediol; examples of the hydroxides of alkali metal include lithium hydroxide, sodium hydroxide and potassium-hydroxide.

Examples of the ammonium-hydroxides include ammonium hydroxide, quaternary ammonium hydroxide and quaternary phosphonium hydroxide; examples of the alkali metal carbonates of include lithium carbonate, sodium carbonate and potassium carbonate.

The other ingredients may be appropriately selected depending on the purpose, and include, for example, antiseptic/antifungal agents, chelating reagents, antirust agents, antioxidants, UV ray absorbers, oxygen absorbers and light stabilizers.

Examples of the antiseptic/antifungal agents include sodium dehydroacetate, sodium sorbate, sodium 2-pyridinethiol-1-oxide, sodium benzoate and sodium pentachlorophenol.

Examples of the chelating reagents include sodium ethylenediamine tetraacetate, sodium nitrilotriacetate, sodium hydroxyethyl ethylenediamine triacetate, sodium diethylenetriamine pentaacetate and sodium uramil diacetate.

Examples of the antirust agents include, acidic sulfite salts, sodium thiosulfate, thiodiglycolic acid ammonium, diisopropylammonium nitrate, pentaerythritol tetranitrate, dicyclohexylammonium nitrate and benzotriazole.

Examples of the antioxidants include phenol antioxidants (including hindered phenol antioxidants), amine antioxidants, sulfur antioxidants and phosphorus antioxidants.

Examples of the phenol antioxidants (including hindered phenol antioxidants) include butylated hydroxyanisole, 2,6-di-tert-butyl-4-ethylphenol, stearyl-beta-(3,5-di-tert-butylhydroxyphenyl)propionate, 2,2'-methylene-bis(4-methyl-6-tert-butylphenol), 2',2'-methylene-bis(4-ethyl-6-tert-butylphenol), 4,4'-butylidene-bis(3-methyl-6-tert-butylphenol), 3,9-bis[1,1-dimethyl-2-[beta-(3-tert-butyl-4-hydroxy-5-methyphenyl)propionyloxy]ethyl]-2,4,8,10-tetraixaspiro-[5.5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene and tetraxis[methylene-3-(3',5'-di-tert-butyl-4'-hydroxyphenyl)propionate]methane.

Examples of the amine antioxidants include phenyl-beta-naphthylamine, alpha-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-5-tert-butyl-phenol, butyl hydroxyanisole, 2,2'-methylene bis(4-methyl-6-tert-butylphenol), 4,4'-butylidene bis(3-methyl-6-tert-butylphenol), 4,4'-thiobis(3-methyl-6-tert-butylphenol), tetraxis[methylene-3-(3,5-di-tert-butyl-4-dihydroxyphenyl)-propionate]methane and 1,1,3-tris(2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl 3,3'-thiodipropionate, distearyl beta,beta'-thiodipropionate, 2-mercaptobenzimidazole and dilauryl sulfide.

Examples of the phosphorous antioxidants include triphenyl phosphite, octadecyl phosphite, triisodecyl phosphite, trilauryl trithiophosphite, and trinonylphenyl phosphite.

Examples of the UV-ray absorbers include benzophenone UV-ray absorbers, benzotriazole UV-ray absorbers, salicylate UV-ray absorbers, cyanoacrylate UV-ray absorbers, and nickel complex salt UV-ray absorbers.

Examples of the benzophenone UV-ray absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole UV-ray absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate UV-ray absorbers include phenyl salicylate, p-tert-butylphenyl salicylate, and p-octylphenyl salicylate.

Examples of the cyanoacrylate UV-ray absorbers include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate, Examples of the nickel complex salt UV-ray absorbers include nickel bis(octylphenyl)sulfide, 2,2'-thiobis(4-tert-octylphelate)-n-butylamine nickel (II), 2,2'-thiobis(4-tert-octylphelate)-2-ethylhexylamine nickel (II) and 2,2'-thiobis(4-tert-octylphelate) triethanolamine nickel (II).

The recording inks according to the present invention may be produced by dispersing or dissolving a pigment dispersion according to the present invention, at least a silicone surfactant or a fluorine-containing surfactant, a water-dispersible resin, a humectant, and optional other ingredients into an aqueous medium, and further stirring and mixing them as required. The dispersing step may be carried out using a sand mill, homogenizer, ball mill, paint shaker, or ultrasonic dispersant, and the stirring and mixing step may be carried out using a conventional stirring device equipped with stirring blades, a magnetic stirrer, or high-speed dispersing device.

The physical properties of the inventive recording inks may be properly selected depending on the application; preferably the viscosity and the surface tension are within the ranges described below.

The viscosity of the inventive recording inks is preferably no more than 20 mPa·s at 25° C., more preferably no more than 15 mPa·s. When the viscosity is above 20 mPa·s, the ejection stability may be difficult to be maintained depending on head configuration.

The surface tension of the inventive recording inks is preferably no more than 35 mN/m at 25° C., more preferably no more than 30 mM/m. When the surface tension is above 35 mN/m, ink leveling may hardly occur on recording media and the drying period may be prolonged.

The color of recording inks according to the present invention may be appropriately selected depending on the purpose, and may be yellow, magenta, cyan or black. Recording using an ink set combining two or more of these colors may make possible to form multicolor images; recording using all-color ink set may make possible to form full color images.

The recording inks according to the present invention may be suitably applied to substantially any printers equipped various ink-jet heads, for example, so-called piezoelectric-type ink-jet heads where a volume in an ink flow path is changed to eject ink drops through deforming a vibration plate, which forms a wall of the ink flow path, by action of a piezoelectric element as a pressure-generating means to press to the ink in the ink flow path (see JP-A No. 02-51734); so-called thermal ink-jet heads where bubbles generate by heating an ink in an ink flow path using an exothermic resistive element (see JP-A No. 61-59911); electrostatic ink-jet heads where an electrode and a vibration plate, which form a wall of an ink flow path, are disposed in an opposed position, and a volume in an ink flow path is changed to eject an ink by electrostatic power generated between the electrode and the vibration plate (see JP-A No. 06-71882).

The recording inks according to the present invention can be utilized for a variety of articles such as fountain pens, ball pens, magic pens, and sign pens, in particular applied as ink-jet recording inks to image forming apparatuses such printers in ink-jet recording, more specifically, printers having a function to facilitate printing fixation by heating paper or inks at 50° C. to 200° C. during, before or after the printing. In addition, the recording inks according to the present invention can be suitably used in ink cartridges, ink recorded matters, ink-jet recording apparatuses, and ink-jet recording methods according to the present invention.

Ink Cartridge

The inventive ink cartridges each include a container to house an inventive recording ink and other optional members as required.

The container may be, without limitation, appropriately selected in terms of shape, structure, size, and material, depending on the purpose; preferable examples thereof are ink bags formed of aluminum-laminate films or resin films.

Figure 2:
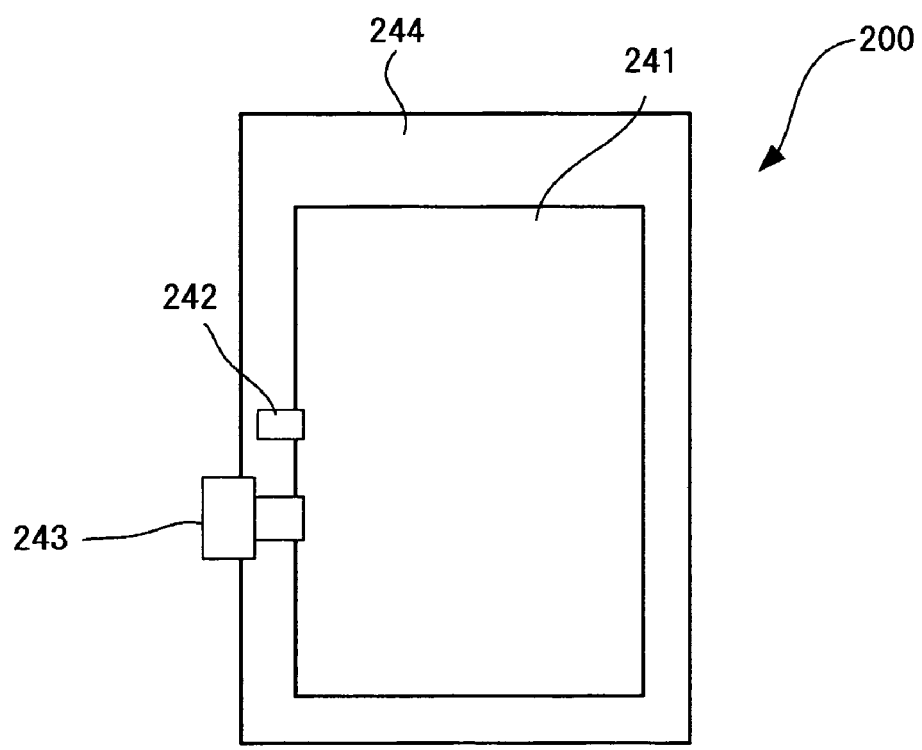
FIG. 2 is a schematic view of the ink cartridge of FIG. 1 and its case.

The ink cartridge will be explained with reference to FIGS. 1 and 2. FIG. 1 is an exemplary inventive ink cartridge, and FIG. 2 shows the ink cartridge packed within a casing or outer packing.

An ink is introduced from an ink inlet 242 into an ink bag 241 of the ink cartridge 200, then the ink bag 241 is degassed and the ink inlet 242 is sealed by fusion bond, as shown in FIG. 1. In use, the ink is supplied to the apparatus through piercing an ink outlet 243 of a rubber member.

The ink bag 241 is typically formed from a packing material such as aluminum-laminate film having no air-permeability. As shown in FIG. 2, the ink bag 241 is typically housed in a plastic cartridge case 244 and detachably mounted to various ink-jet recording apparatuses.

The inventive ink cartridges have the inventive recording inks and are used by detachably amounting to various ink-jet recording apparatuses, and particularly preferably to the inventive ink-jet recording apparatuses described later.

Ink-jet Recording Apparatus and Ink-Jet Recording Method

The inventive ink-jet recording apparatuses have at least an ink ejecting unit and other optional units such as a stimulus generation unit and a control unit.

The inventive ink-jet recording method contains at least an ink ejecting step and also other optional steps such as a stimulus generation step and a control step. The inventive ink-jet recording method may be suitably carried out by the inventive ink-jet recording apparatus; the ink ejecting step may be suitably carried out by the ink ejecting unit.

Ink Ejecting Step and Ink Ejecting Unit

The ink ejecting step is one to eject the inventive recording ink by applying a stimulus to the recording ink thereby to form images.

The ink ejecting unit is one to eject the inventive recording ink by applying a stimulus to the recording ink thereby to form images. The ink ejecting may be properly selected depending on the application; examples thereof include various nozzles for ink-jet printing.

The stimulus may be properly selected depending on the application; examples thereof include heat, pressure, vibration, and light. These may be used alone or in combination of two or more. Among these, the heat and the pressure are preferable.

Examples of the stimulus generation unit include heating devices, pressurizing devices, piezoelectric elements, vibration generating devices, ultrasonic oscillators, and lights, more specifically, piezoelectric actuators such as piezoelectric elements, thermal actuators which utilize a phase change by membrane boiling of the liquid using an electric thermal conversion element such as an exothermal resistive element, shape memory alloy actuators using a metallic phase change by thermal change, and electrostatic actuators using an electrostatic power.

The way to eject the recording ink may be properly selected depending on the stimulus; in cases where the stimulus is derived by "heat", such a method is available as heat energy corresponding to recording signals is imparted using a thermal head to the recording ink in a recording head to generate bubbles in the recording ink by the heat energy and the recording ink is jetted and ejected as liquid drops from a nozzle pore of the recording head by pressure of the bubbles. In cases where the stimulus is derived by "pressure", such a method is available that a piezoelectric element is bended and a volume in a pressure room is reduced to eject the recording ink as droplets from the nozzle pore of the recording head by applying voltage to the piezoelectric element adhered at a position called the pressure room in the ink flow path in the recording head.

The droplet size of ejected recording inks is preferably 3 to 40 pl, the speed of ejected drops is preferably 5 to 20 m/s, the driving frequency is preferably 1 kHz or more, and the resolution is preferably 300 dpi or more.

The control unit may be properly selected depending on the purpose; examples thereof include instruments such as sequencers and computers.

Figure 3:
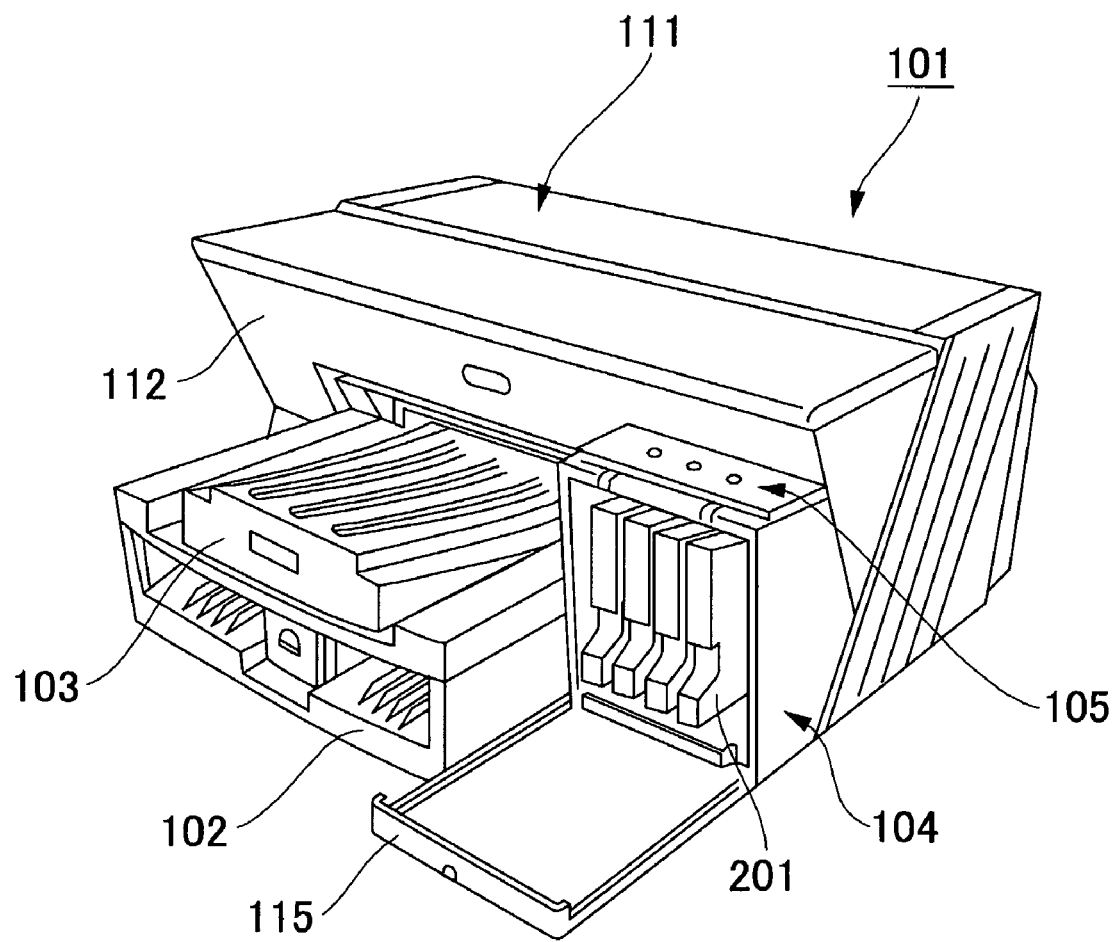
FIG. 3 is a schematic perspective view of an ink cartridge-mounting portion of an ink-jet recording apparatus with its cover being opened.

An embodiment to carry out the inventive ink-jet recording method by the inventive ink-jet recording apparatus will be described with reference to drawings. The ink-jet recording apparatus shown in FIG. 3 has a main body 101, a paper supply tray 102 mounted to the main body 101, a paper discharge tray 103 for stocking the paper on which images being recorded, and an ink cartridge section 104. An operation section 105 of operation keys and displays etc. is disposed on the ink cartridge loading section 104. The ink cartridge section 104 has an openable/closable front cover 115 for detaching the ink cartridge 201.

Figure 4:
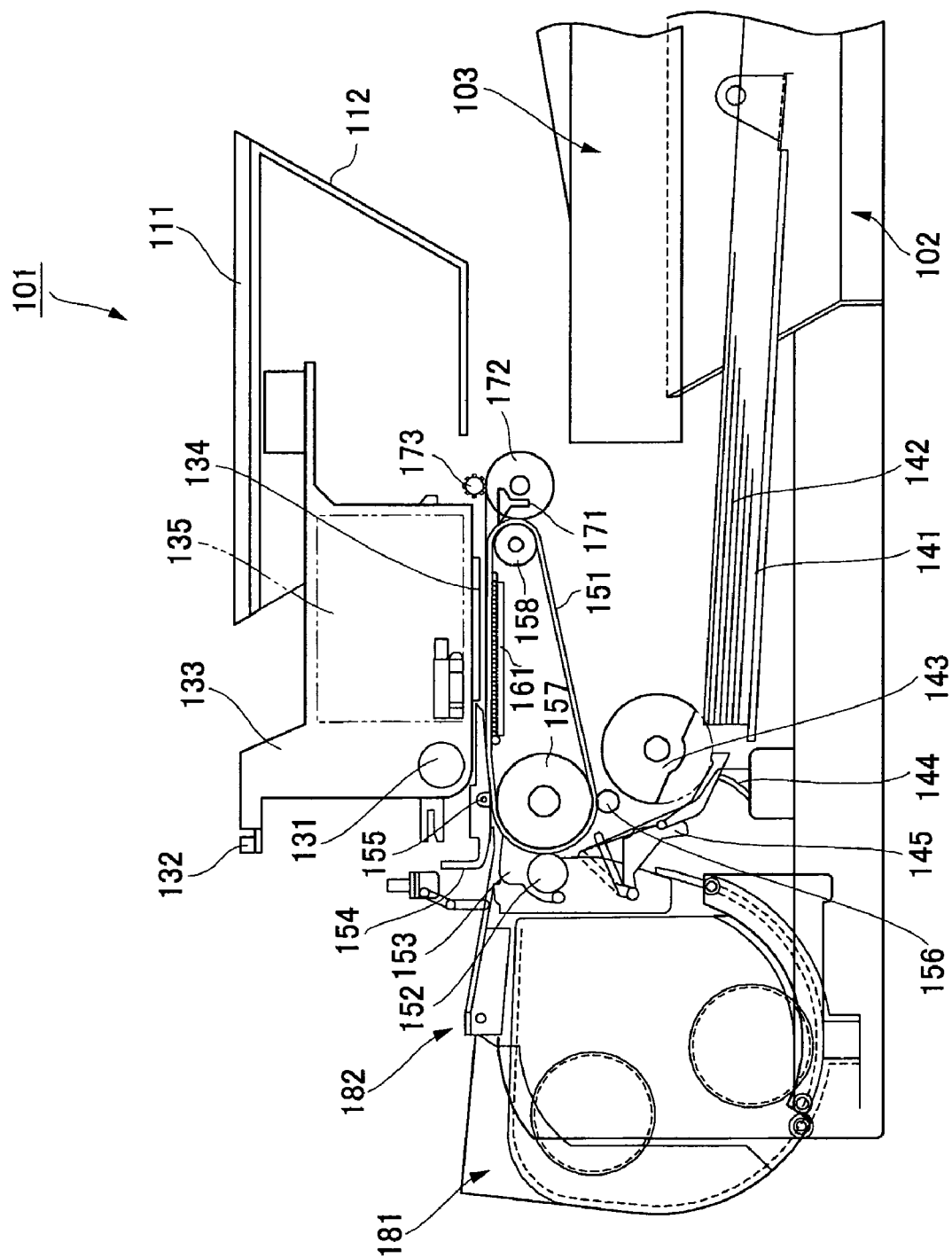
FIG. 4 is a schematic view that shows an entire configuration of an ink-jet recording apparatus.
Figure 5:
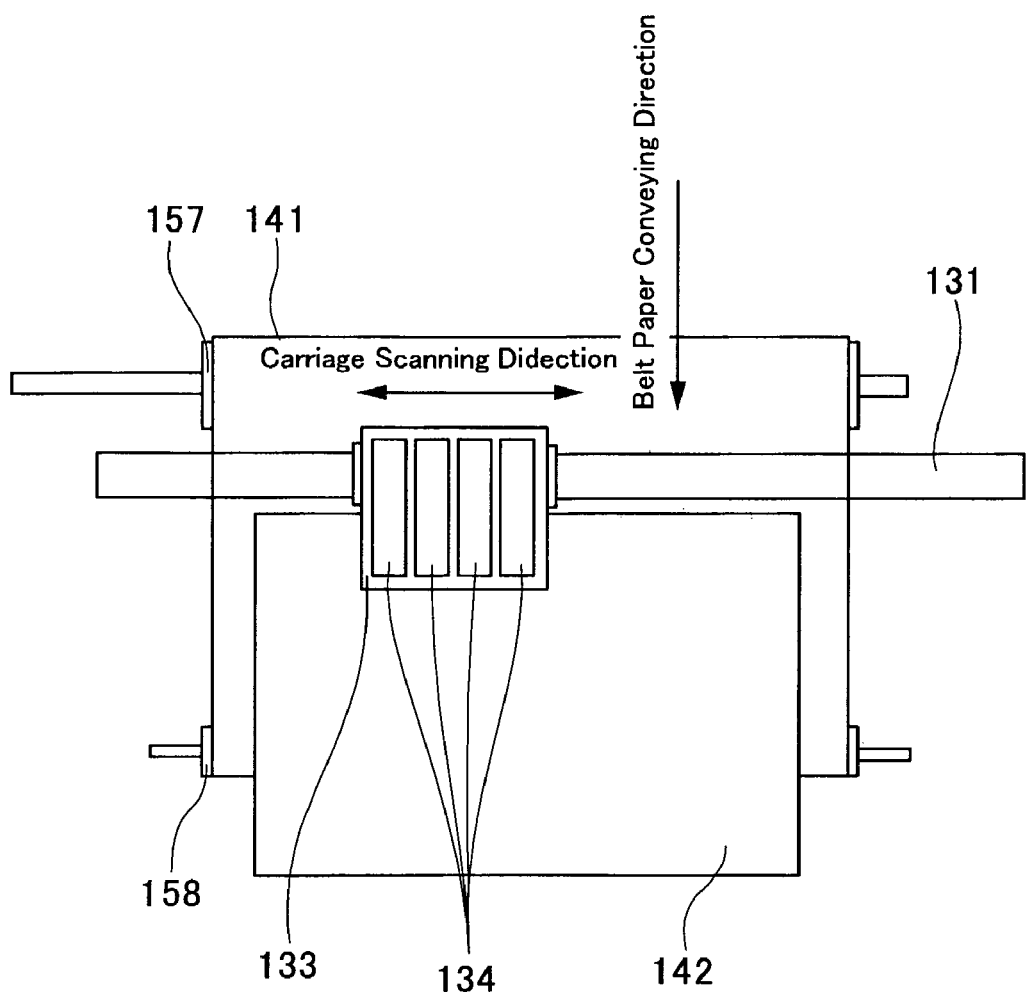
FIG. 5 is a schematic enlarged view that exemplarily shows an ink-jet head according to the present invention.

As shown in FIGS. 4 and 5, a carriage 133 is retained with freely sliding in a main scanning direction by a guide rod 131 which is a guide member bridged laterally to right and left side plates (not shown) and a stay 132, and is moved and scanned by a main scanning motor (not shown) in an arrow direction in FIG. 5.

In the carriage 133, a recording head 134 formed of four heads to eject jet-ink drops of respective colors, i.e. yellow (Y), cyan (C), magenta (M) and black (B), is loaded such that multiple ink ejecting openings are arranged in a direction that intersects with the main scanning direction with the ink ejecting direction being directed downward.

The ink-jet recording head of the recording head 134 may be those containing a piezoelectric actuator such as a piezoelectric element, thermal actuator utilizing phase change by membrane boiling of the liquid using the electric thermal conversion element such as an exothermal resistive element, a shape memory alloy actuator using a metallic phase change by thermal change, and an electrostatic actuator using the electrostatic power, as the energy generation unit to jet the recording ink.

The carriage 133 has a subtank 135 for each color to supply each color ink. The inventive recording ink is supplied from an inventive ink cartridge 201 mounted in the ink cartridge loading section 105 to the subtank 135 through the supplying tube for the recording ink (not shown).

Meanwhile, a paper supply section which supplies the paper 142 taken on a paper stacking section 141 of the paper supply tray 102 comprises a half moon type roller or paper supply roller 143 which separates and feeds the paper one by one from the paper stacking section 141 and a separation pad 144 opposed to the paper supply roller 143 and composed of the material with large friction coefficient, and this separation pad 144 is urged toward the paper supply roller 143 side.

A feeding section for feeding the paper supplied from the paper supply section beneath the recording head 134 has a feeding belt 151 for feeding the paper 142 by absorbing electrostatically, a counter roller 152 for feeding the paper 142 sent through a guide 145 from the paper supply section by sandwiching with the feeding belt 151, a feeding guide 153 for feeding the paper sent in a nearly vertical upward direction on the feeding belt 151 by changing the direction of the paper at about 90°, and a tip pressurizing roller 156 biased to the feeding belt 151 side with a pushing member 154. An electrical charging roller 156 which is an electrical charge mean to charge the surface of the feeding belt 151 is also comprised.

The feeding belt 151 is an endless belt, is disposed between a feeding roller 157 and a tension roller 158, and is capable of going around in a belt feeding direction. This feeding belt 151 has a surface layer which is a paper absorbing surface formed from, for example, a resin material with a thickness of about 40 μm to which resistance control has not been given, for example, a copolymer of tetrafluoroethylene and ethylene, and a back layer (medium resistant layer, an earth layer) to which the resistance control by carbon has been given with the same material as this surface layer. A guide member 161 corresponding to the printing region by the recording head 134 is disposed on the back side of the feeding belt 151. A paper discharging section for discharging the paper 142 recorded at the recording head 134 comprises a separation nail 171 for separating the paper 142 from the feeding belt 151, a paper discharging roller 172 and a discharging half moon type roller 173. A paper discharge tray 103 is disposed beneath the paper discharging roller 172.

A both side paper supply unit 181 is detachably loaded on the backside section of the main body 101. The both side paper supply unit 181 takes in the paper 142 returned in a reverse direction rotation of the feeding belt 151, reverses the paper 142 and supplies it again between the counter roller 152 and the feeding belt 151. A manual paper supply section 182 is provided on the upper surface of the both side paper supply unit 181.

In this ink-jet recording apparatus, the paper 142 is separated and supplied one by one from the paper supply section, the paper 142 supplied in the nearly vertical upward direction is guided by the guide 145, and fed by being sandwiched with the feeding belt 151 and the counter roller 152. The tip of the paper is further guided by the feeding guide 153, mounted on the feeding belt 151 at the tip pressurizing half moon type roller 155, and changed in about 90° in its feeding direction.

At that time, the feeding belt 157 is charged by the electrical charging roller 156, and the paper 142 is fed by being absorbed electrostatically. The ink drop is jetted onto the stopping paper 142 to record one line by driving the recording head 134 depending on the image signals with moving the carriage 133 there, and next line is recorded after feeding the paper 142 to a given amount. A recording operation is terminated by receiving a recording termination signal or a signal that a back end of the paper 142 has reached the recording region, then the paper 142 is discharged to the paper discharge tray 103.

When a remaining amount near end of the recording ink in the subtank 135 is detected, the recording ink in a given amount is supplied from the ink cartridge 201 to the subtank 135.

In this ink-jet recording apparatus, when the recording ink in the inventive ink cartridge 201 is finished out, a housing in the ink cartridge 201 can be decomposed and only the ink bag inside can be changed. Even when the ink cartridge is constituted in vertical mounted front loading, it is possible to stably supply the recording ink. Therefore, even when disposed by occupying upwards of the main body 101, for example, even when housed in a rack or an object has been placed on the main body 101, it is possible to easily change the ink cartridge 201.

Here, the present invention is described with respect to the serial type (shuttle type) where the carriage being scanned, the inventive recording inks can also be likewise, applied to line type ink-jet recording apparatuses having a line-type head.

The inventive ink-jet recording apparatuses and the ink-jet recording methods can be applied to various recordings based on ink-jet recording systems, for example, to printers for ink-jet recording, facsimile apparatuses, copying apparatuses, printer/facsimile/copier composite machines, and the like Ink Recorded Matter The inventive ink recorded matters are those recorded by means of inventive ink-jet recording apparatuses and inventive ink-jet recording methods. The inventive ink recorded matters have images formed on recording media using the inventive recording inks.

The recording media may be properly selected depending on the purpose; examples thereof include regular paper, glossy paper, special paper, fabrics, films, OHP sheets, or the like. These may be used alone or in combination.

The inventive ink recorded matters are of high image quality, with no bleeding, and excellently stable with time, therefore can be suitably utilized for various printing, literatures or documents with a variety of images and/or letters.

EXAMPLES

The present invention will be explained with reference to examples, but it should be understood that the present invention is not limited thereto at all. In the following descriptions, all parts and percent are based on "mass" unless indicated otherwise.

Preparation Example A-1

Preparation of Solution A-1 of Polymer Dispersion Stabilizer

A mixture of ingredients shown below were mixed under heating by a mechanical stirrer to dissolve alpha-olefin/maleic anhydride copolymer (I), then a minute amount of insoluble matters were filtered off using a filter having an average pore size of 5 μm, thereby to prepare the solution A-1 of polymer dispersion stabilizer.

| | |
|---|---|
| Alpha-olefin/maleic anhydride copolymer (I)*[1] | 10.0 parts |
| 1N KOH aqueous solution*[2] | 68.62 parts |
| Deionized water | 21.38 parts |

*[1]T-YP110 by Seico PMC Co., carbon-atom number of olefin chain: 12 to 14, acid value: 385 mgKOH/g, mass average molecular weight: 9000
*[2]1.0 time amount of alkali on the basis of acid value Preparation Example A-2

Preparation of Solution B of Polymer Dispersion Stabilizer

A mixture of ingredients shown below were mixed under heating by a mechanical stirrer to dissolve alpha-olefin/maleic anhydride copolymer (II), then a minute amount of insoluble matters were filtered off using a filter having an average pore size of 5 μm, thereby to prepare the solution B of polymer dispersion stabilizer.

| | |
|---|---|
| Alpha-olefin/maleic anhydride copolymer (II)*[1] | 10.0 parts |
| 1N NaOH aqueous solution*[2] | 28.08 parts |
| Deionized water | 61.92 parts |

*[1]T-YP111 by Seico PMC Co., carbon-atom number of olefin chain: 16 to 18, acid value: 221 mgKOH/g, mass average molecular weight: 11000
*[2]1.0 time amount of alkali on the basis of acid value Preparation Example A-3

Preparation of Solution C of Polymer Dispersion Stabilizer

A mixture of ingredients shown below were mixed under heating by a mechanical stirrer to dissolve alpha-olefin/maleic anhydride copolymer (III), then a minute amount of insoluble matters were filtered off using a filter having an average pore size of 5 μm, thereby to prepare the solution C of polymer dispersion stabilizer.

| | |
|---|---|
| Alpha-olefin/maleic anhydride copolymer (III)*[1] | 10.0 parts |
| 1N LiOH aqueous solution*[2] | 17.34 parts |
| Deionized water | 72.66 parts |

*[1]T-YP112 by Seico PMC Co., carbon-atom number of olefin chain: 20 to 24, acid value: 190 mgKOH/g, mass average molecular weight: 10000
*[2]1.2 times amount of alkali on the basis of acid value Preparation Example A-4

Preparation of Solution D of Polymer Dispersion Stabilizer

A mixture of ingredients shown below were mixed under heating by a mechanical stirrer to dissolve alpha-olefin/maleic anhydride copolymer (IV), then a minute amount of insoluble matters were filtered off using a filter having an average pore size of 5 μm, thereby to prepare the solution D of polymer dispersion stabilizer.

| | |
|---|---|
| Alpha-olefin/maleic anhydride copolymer (IV)*[1] | 10.0 parts |
| 1N ammonia aqueous solution*[2] | 25.15 parts |
| Deionized water | 64.85 parts |

*[1]T-YP113 by Seico PMC Co., carbon-atom number of olefin chain: 16 to 18, acid value: 310 mgKOH/g, mass average molecular weight: 11400
*[2]1.5 times amount of alkali on the basis of acid value Example A-1

Preparation of Pigment Dispersion I

| | |
|---|---|
| Monoazo yellow pigment*[1] | 20.0 parts |
| Polyoxyethylene beta-naphthylether (RT-100)*[2] | 6.6 parts |
| Deionized water | 73.4 parts |

*[1]C.I. pigment yellow 74, by Dainichiseika Color & Chemicals Mfg. Co.
*[2]nonionic surfactant, HLB value: 18.5, by Takemoto Oil & Fat Co.

Initially, the nonionic surfactant described above was dissolved into deionized water to prepare a solution, then the solution was mixed with to wet the pigment described above sufficiently. The mixture was then dispersed at 2000 rpm for 4 hours by use of KDLA Model Dyno-Mill wet-type disperser (by WAB Machinery Co.) filled with zirconia beads of 0.5 mm diameter thereby to prepare a primary pigment dispersion. The solution A-1 of polymer dispersion stabilizer described above was add in an amount of 20.0 parts to the primary pigment dispersion to stir the mixture sufficiently thereby to prepare pigment dispersion I. The average particle diameter $D_{50}$ of the pigment dispersion I was 49 nm in accordance with the measurement using UPA-EX150 (by Micro Track Co.).

Example A-2

Preparation of Pigment Dispersion II

| | |
|---|---|
| Quinacridone pigment (C.I. pigment red 122)*[1] | 20.0 parts |
| Polyoxyethylene laurylether (DKS NL-450)*[2] | 6.6 parts |
| Deionized water | 73.4 parts |

*[1]by Dainichiseika Color & Chemicals Mfg. Co.
*[2]nonionic surfactant, HLB value: 18.3, by Dai-ichi Kogyo Seiyaku Co.

Initially, the nonionic surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion. The solution B of polymer dispersion stabilizer described above was add in an amount of 20.0 parts to the primary pigment dispersion to stir the mixture sufficiently thereby to prepare pigment dispersion II. The average particle diameter $D_{50}$ of the pigment dispersion II was 81 nm in accordance with the measurement using UPA-EX150 (by Micro Track Co.).

Example A-3

Preparation of Pigment Dispersion III

| | |
|---|---|
| Phthalocyanine pigment*[1] | 20.0 parts |
| Polyoxyethylene styrenephenylether*[2] | 6.6 parts |
| Deionized water | 73.4 parts |

*[1]C.I. pigment blue 15:3, by Dainichiseika Color & Chemicals Mfg. Co.
*[2]Noigen EA-197, nonionic surfactant, HLB value: 17.5, by Dai-ichi Kogyo Seiyaku Co.

Initially, the nonionic surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion. The solution C of polymer dispersion stabilizer described above was add in an amount of 20.0 parts to the primary pigment dispersion to stir the mixture sufficiently thereby to prepare pigment dispersion III. The average particle diameter $D_{50}$ of the pigment dispersion III was 83 nm in accordance with the measurement using UPA-EX150 (by Micro Track Co.).

Example A-4

Preparation of Pigment Dispersion IV

| | |
|---|---|
| Silica/disazo yellow complex pigment*[1] | 24 parts |
| Sodium dioctylsulfosuccinate (Newcol 291M)*[2] | 8 parts |
| Deionized water | 68 parts |

*[1]inorganic/organic ratio: 1/1, primary particle size: 17 nm, by Toda Kogyo Co.
*[2]anionic surfactant, by Nippon Nyukazai Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion. The solution C of polymer dispersion stabilizer described above was add in an amount of 20.0 parts to the primary pigment dispersion to stir the mixture sufficiently thereby to prepare pigment dispersion IV. The average particle diameter $D_{50}$ of the pigment dispersion IV was 39 nm in accordance with the measurement using UPA-EX150 (by Micro Track Co.).

Example A-5

Preparation of Pigment Dispersion V

| | |
|---|---|
| Silica/quinacridone PR122 complex pigment*[1] | 28 parts |
| Anionic surfactant High Tehnol NF-17*[2] | 9.2 parts |
| Deionized water | 62.8 parts |

*[1]inorganic/organic ratio: 1/1, primary particle size: 16 nm, by Toda Kogyo Co.
*[2]polyoxyethylene styrenephenylether ammonium sulfonate by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery-Co.) filled with zirconia beads of 0.5 mm diameter thereby to prepare a primary pigment dispersion. The solution B of polymer dispersion stabilizer described above was add in an amount of 21.0 parts to the primary pigment dispersion to stir the mixture sufficiently thereby to prepare pigment dispersion V. The average particle diameter $D_{50}$ of the pigment dispersion V was 75 nm in accordance with the measurement using UPA-EX150 (by Micro Track Co.).

Example A-6

Preparation of Pigment Dispersion VI

| | |
|---|---|
| Silica/Phthalocyanine PB15:3 complex pigment*[1] | 24 parts |
| Polyoxyethylene laurylether (DKS NL-180)*[2] | 8 parts |
| Deionized water | 68 parts |

*[1]inorganic/organic ratio: 1/1, primary particle size: 16 nm, by Toda Kogyo Co.
*[2]nonionic surfactant, HLB value: 16.2, by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion. The solution C of polymer dispersion stabilizer described above was add in an amount of 20.0 parts to the primary pigment dispersion to stir the mixture sufficiently thereby to prepare pigment dispersion VI. The average particle diameter $D_{50}$ of the pigment dispersion VI was 78 nm in accordance with the measurement using UPA-EX150 (by Micro Track Co.).

Example A-7

Preparation of Pigment Dispersion VII

| | |
|---|---|
| Silica/disazo yellow complex pigment*[1] | 24 parts |
| Polyoxyethylene laurylether (DKS NL-450)*[2] | 8 parts |
| Solution C of polymer dispersion stabilizer | 20 parts |
| Deionized water | 68 parts |

*[1]inorganic/organic ratio: 1/1, primary particle size: 17 nm, by Toda Kogyo Co.
*[2]nonionic surfactant, HLB value: 18.3, by Dai-ichi Kogyo Seiyaku Co.

Initially, the surfactant described above was dissolved into deionized water to prepare a solution, then the solution and the solution C of polymer dispersion stabilizer were mixed with to wet the pigment described above sufficiently. The mixture was then dispersed at 2000 rpm for 1.5 hours by use of KDLA Model Dyno-Mill wet-type disperser (by WAB Machinery Co.) filled with zirconia beads of 0.5 mm diameter thereby to prepare a pigment dispersion VII. The average particle diameter $D_{50}$ of the pigment dispersion VII was 39 nm in accordance with the measurement using UPA-EX150 (by Micro Track Co.).

Example A-8

Preparation of Pigment Dispersion VIII

| | |
|---|---|
| Silica/Phthalocyanine PB15:3 complex pigment*[1] | 24 parts |
| Polyoxyethylene polycyclic phenylether*[2] | 8 parts |
| Deionized water | 68 parts |

*[1]inorganic/organic ratio: 1/1, primary particle size: 16 nm, by Toda Kogyo Co.
*[2]nonionic surfactant, Newcol 780, HLB value: 18.9, by Nippon Nyukazai Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion. The solution B of polymer dispersion stabilizer described above was add in an amount of 20.0 parts to the primary pigment dispersion to stir the mixture sufficiently thereby to prepare pigment dispersion VIII. The average particle diameter $D_{50}$ of the pigment dispersion VII was 125 nm in accordance with the measurement using UPA-EX150 (by Micro Track Co.).

Comparative Example A-1

Preparation of Pigment Dispersion IX

Pigment dispersion IX was prepared in the same manner as Example A-3 to prepare pigment the dispersion III except that the solution C of polymer dispersion stabilizer was not added. The average particle diameter $D_{50}$ of the pigment dispersion IX was 81 nm in accordance with the measurement using UPA-EX150 (by Micro Track Co.).

Comparative Example A-2

Preparation of Pigment Dispersion X

Pigment dispersion X was prepared in the same manner as Example A-3 to prepare the pigment dispersion III except that the solution C of polymer dispersion stabilizer was exchanged into solution E of the styrene/maleic acid copolymer shown below. The average particle diameter $D_{50}$ of the pigment dispersion X was 85 nm in accordance with the measurement using UPA-EX150 (by Micro Track Co.).

Solution E of the styrene/maleic acid copolymer: Polymaron 351S, acid value: 560 mgKOH/g, average molecular weight: 100000 to 110000, solid content: 10.2%, by Arakawa Chemical Industries

Example A-9

Preparation of Recording Ink

| | |
|---|---|
| Pigment Dispersion I | 36 parts |
| Boncoat 4001 (aqueous acrylic emulsion)*[1] | 6 parts |
| Glycerin | 10 parts |
| Triethylene glycol | 25 parts |
| 2,2,4-Trimethyl-1,3-pentanediol | 4 parts |
| Polyfox PF-151N (active ingredient: 50%)*[2] | 2 parts |
| Proxel LV (antiseptic/antifungal agent)*[3] | 0.2 part |
| Triethanolamine | 0.1 part |
| Deionized water | 16.7 pats |

*[1] solid content: 50%, MFT: 5° C., average particle diameter: 100 nm, by Dainippon Ink & Chemicals, Inc.
*[2] oligomer-type nonionic fluorine-containing surfactant, by Omnova Co.
*[3] 1,2-benzisothiazolin-3-one, active ingredient: 20%, with dipropylene glycol, by Avecia Co.

The above-noted Boncoat 4001, glycerin, triethylene glycol, 2,2,4-trimethyl-1,3-pentanediol, Polyfox PF-151N, Proxel LV, and triethanolamine were dissolved into deionized water to prepare a vehicle, which was mixed with the pigment dispersion I to prepare a mixture, then the mixture was press-filtered through a cellulose acetate membrane filter of 0.8 µm average pore size to prepare the recording ink of Example A-9.

Example A-10

Preparation of Recording Ink

| | |
|---|---|
| Pigment Dispersion II | 42 parts |
| Hydran HW-940 (solid content: 50%)*[1] | 7 parts |
| Glycerin | 6 parts |
| 3-Methyl-1,3-butanediol | 19 parts |
| 2-Ethyl-1,3-hexanediol | 2 parts |
| Zoneal FS-300 (active ingredient: 40%)*[2] | 2.5 parts |
| Proxel LV (antiseptic/antifungal agent)*[3] | 0.2 part |
| 2-Amino-2-ethyl-1,3-propanediol | 0.1 part |
| Deionized water | 18.2 pats |

*[1] polyester/urethane aqueous ionomer, MFT: 0° C., average particle diameter: 20 nm, by Dainippon Ink & Chemicals, Inc.
*[2] polyoxyethylene perfluoroalkylether, by DuPont Co.
*[3] 1,2-benzisothiazolin-3-one, active ingredient: 20%, with dipropylene glycol, by Avecia Co.

The above-noted Hydran HW-940, glycerin, 3-methyl-1,3-butanediol, 2-ethyl-1,3-hexanediol, Zoneal FS-300, Proxel LV, and 2-amino-2-ethyl-1,3-propanediol were dissolved into deionized water to prepare a vehicle, which was mixed with the pigment dispersion II to prepare a mixture, then the mixture was press-filtered through a cellulose acetate membrane filter of 0.8 µm average pore size to prepare the recording ink of Example A-10.

Example A-11

Preparation of Recording Ink

| | |
|---|---|
| Pigment Dispersion III | 36 parts |
| Acrit WEM-321U (solid content: 38%)*[1] | 7.9 parts |
| Glycerin | 7.5 parts |
| 1,3-Butanediol | 22.5 parts |
| 2-Ethyl-1,3-hexanediol | 4.0 parts |
| Polyfox PF-156A (active ingredient: 30%)*[2] | 3.3 parts |
| Proxel LV (antiseptic/antifungal agent)*[3] | 0.2 part |
| 2-Amino-2-ethyl-1,3-propanediol | 0.1 part |
| Deionized water | 18.5 pats |

*[1] acrylic/urethane aqueous emulsion, MFT: 10° C., average particle diameter: 100 nm, by Taisei Kako Co.
*[2] anionic fluorine-containing surfactant, by Omnova Co.
*[3] 1,2-benzisothiazolin-3-one, active ingredient: 20%, with dipropylene glycol, by Avecia Co.

The above-noted Acrit WEM-321U, glycerin, 1,3-butanediol, 2-ethyl-1,3-hexanediol, Polyfox PF-156A, Proxel LV, and 2-amino-2-ethyl-1,3-propanediol were dissolved into deionized water to prepare a vehicle, which was mixed with the pigment dispersion III to prepare a mixture, then the mixture was press-filtered through a cellulose acetate membrane filter of 0.8 µm average pore size to prepare the recording ink of Example A-11.

Example A-12

Preparation of Recording Ink

| | |
|---|---|
| Pigment Dispersion IV | 35 parts |
| Boncoat 4001 (aqueous acrylic emulsion)*[1] | 7.0 parts |
| Glycerin | 7.5 parts |
| Diethylene glycol | 22.5 parts |
| 2,2,4-Trimethyl-1,3-pentanediol | 4.0 parts |
| Polyfox PF-151N (active ingredient: 50%)*[2] | 2.0 parts |
| Proxel LV (antiseptic/antifungal agent)*[3] | 0.2 part |
| 2-Amino-2-ethyl-1,3-propanediol | 0.1 part |
| Deionized water | 21.7 pats |

*[1] solid content: 50%, MFT: 5° C., average particle diameter: 100 nm, by Dainippon Ink & Chemicals, Inc.
*[2] oligomer-type nonionic fluorine-containing surfactant, by Omnova Co.
*[3] 1,2-benzisothiazolin-3-one, active ingredient: 20%, with dipropylene glycol, by Avecia Co.

The above-noted Boncoat 4001, glycerin, diethylene glycol, 2,2,4-trimethyl-1,3-pentanediol, Polyfox PF-151N, Proxel LV, and 2-amino-2-ethyl-1,3-propanediol were dissolved into deionized water to prepare a vehicle, which was mixed with the pigment dispersion IV to prepare a mixture, then the mixture was press-filtered through a cellulose acetate membrane filter of 0.8 μm: average pore size to prepare the recording ink of Example A-12.

Example A-13

Preparation of Recording Ink

| Pigment Dispersion V | 38.9 parts |
|---|---|
| Hydran HW-940 (solid content: 50%)[1] | 9.0 parts |
| Glycerin | 6.0 parts |
| 3-Methyl-1,3-butanediol | 19 parts |
| 2-Ethyl-1,3-hexanediol | 2.0 parts |
| Zoneal FS-300 (active ingredient: 40%)[2] | 2.5 parts |
| Proxel LV (antiseptic/antifungal agent)[3] | 0.2 part |
| Triethanolanine | 0.1 part |
| Deionized water | 18.2 pats |

[1] polyester/urethane aqueous ionomer, MFT: 0° C., average particle diameter: 20 nm, by Dainippon Ink & Chemicals, Inc.
[2] polyoxyethylene perfluoroalkylether, by DuPont Co.
[3] 1,2-benzisothiazolin-3-one, active ingredient: 20%, with dipropylene glycol, by Avecia Co.

The above-noted Hydran HW-940, glycerin, 3-methyl-1,3-butanediol, 2-ethyl-1,3-hexanediol, Zoneal FS-300, Proxel LV, and triethanolamine were dissolved into deionized water to prepare a vehicle, which was mixed with the pigment dispersion V to prepare a mixture, then the mixture Was press-filtered through a cellulose acetate membrane filter of 0.8 μm average pore size to prepare the recording ink of Example A-13.

Example A-14

Preparation of Recording Ink

| Pigment Dispersion VI | 35 parts |
|---|---|
| Acrit WEM-321U (solid content: 38%)[1] | 7 parts |
| Glycerin | 7.5 parts |
| 1,3-Butanediol | 22.5 parts |
| 2-Ethyl-1,3-hexanediol | 4 parts |
| Polyfox PF-156A (active ingredient: 30%)[2] | 3.3 parts |
| Proxel LV (antiseptic/antifungal agent)[3] | 0.2 part |
| 2-Amino-2-ethyl-1,3-propanediol | 0.1 part |
| Deionized water | 20.4 pats |

[1] acrylic/urethane aqueous emulsion, MFT: 10° C., average particle diameter: 100 nm, by Taisei Kako Co.
[2] anionic fluorine-containing surfactant, by Omnova Co.
[3] 1,2-benzisothiazolin-3-one, active ingredient: 20%, with dipropylene glycol, by Avecia Co.

The above-noted Acrit WEM-321U, glycerin, 1,3-butanediol, 2-ethyl-1,3-hexanediol, Polyfox PF-156A, Proxel LV, and 2-amino-2-ethyl-1,3-propanediol were dissolved into deionized water to prepare a vehicle, which was mixed with the pigment dispersion VI to prepare a mixture, then the mixture was press-filtered through a cellulose acetate membrane filter of 0.8 μm average pore size to prepare the recording ink of Example A-14.

Example A-15

Preparation of Recording Ink

| Pigment Dispersion VII | 35 parts |
|---|---|
| Boncoat 4001 (aqueous acrylic emulsion)[1] | 7 parts |
| Glycerin | 7.5 parts |
| 3-Methyl-1,3-butanediol | 22.5 parts |
| 2,2,4-Trimethyl-1,3-pentanediol | 4 parts |
| Polyfox PF-151N (active ingredient: 50%)[2] | 2 parts |
| Proxel LV (antiseptic/antifungal agent)[3] | 0.2 part |
| 2-Amino-2-ethyl-1,3-propanediol | 0.1 part |
| Deionized water | 21.7 pats |

[1] solid content: 50%, MFT: 5° C., average particle diameter: 100 nm, by Dainippon Ink & Chemicals, Inc.
[2] oligomer-type nonionic fluorine-containing surfactant, by Omnova Co.
[3] 1,2-benzisothiazolin-3-one, active ingredient: 20%, with dipropylene glycol, by Avecia Co.

The above-noted, Boncoat 4001, glycerin, 3-methyl-1,3-butanediol, 2,2,4-trimethyl-1,3-pentanediol, Polyfox PF-151N, Proxel LV, and 2-amino-2-ethyl-1,3-propanediol were dissolved into deionized water to prepare a vehicle, which was mixed with the pigment dispersion VII to prepare a mixture, then the mixture was press-filtered through a cellulose acetate membrane filter of 0.8 μm average pore size to prepare the recording ink of Example A-15.

Example A-16

Preparation of Recording Ink

The recording ink of Example A-16 was prepared in the same manner as Example A-14 except that the pigment dispersion VI was exchanged into the pigment dispersion VIII.

Comparative Example A-3

Preparation of Recording Ink

The recording ink of Comparative Example A-3 was prepared in the same manner as Example A-14 except that Softanol EP-5035 (polyoxyethylene polyoxypropylene branched alkylether, active ingredient: 100%, by Nippon Shokubai Co.) was used in place of the Polyfox PF-156A such that the amounts of both active ingredients being equivalent while adjusting the additive amounts and additional deionized water.

Comparative Example A-4

Preparation of Recording Ink

The recording ink of Comparative Example A-4 was prepared in the same manner as Example A-9 except the Boncoat 4001 was not used.

Comparative Example A-5

Preparation of Recording Ink

The recording ink of Comparative Example A-5 was prepared in the same manner as Example A-10 except the Zoneal FS-300 was not used.

Comparative Example A-6

Preparation of Recording Ink

The recording ink of Comparative Example A-6 was prepared in the same manner as Example A-11 except the pigment dispersion III was exchanged into the pigment dispersion IX of Comparative Example 1.

Comparative Example A-7

Preparation of Recording Ink

The recording ink of Comparative Example A-7 was prepared in the same manner as Example A-11 except the pigment dispersion III was exchanged into the pigment dispersion X of Comparative Example 2.

Comparative Example A-8

Preparation of Recording Ink

Ink Composition

| | |
|---|---|
| C.I. Acid Red 52 (water-soluble dye) | 3 parts |
| Glycerin | 5 parts |
| Diethylene glycol | 15 parts |
| 2-Ethyl-1,3-hexanediol | 2 parts |
| Polyoxyethylene (n = 18) lauryl ether*[1] | 1 part |
| Sodium dehydroacetate | 0.2 part |
| Deionized water | 8 parts |

*[1] nonionic surfactant, HLB: 16.2, by Dai-ichi Kogyo Seiyaku Co.

The composition of the ingredients described above was stirred to produce a solution, then pH of the solution was adjusted to approximately 10 by use of a 10% by mass aqueous solution of lithium hydroxide thereby to prepare a coarse ink, which was then press-filtered through a cellulose acetate membrane filter of 0.8 μm average pore size to prepare the dye-containing ink of Comparative Example A-8.

Ink properties were evaluated as follows with respect to the resulting recording inks of Examples A-9 to A-16 and Comparative Examples of A-3 to A-8; and also the ejection performance and images of these recording inks were evaluated using an ink-jet printer (IPSIO G707, by Ricoh Co.) after filling these recording inks into cartridges as shown in FIGS. 1 and 2. The results are shown in Table 1.

Evaluation of Stability (Change Rate)

Stability of the recording inks was evaluated on the basis of change rate of average particle diameters $D_{50}$ after storage at 50° C. for one week in dry condition. The change rate was calculated from the following equation; the average particle diameter $D_{50}$ was measured in accordance with the measurement using UPA-EX150 (by Micro Track Co.).

Change Rate=$D_{50}$ after storage/$D_{50}$ before storage×100

Measurement of Surface Tension

Surface tension of the recording inks is a static surface tension measured on a platinum plate at 25° C. using a surface tension meter (CBVP-Z, Kyowa Interface Science Co.).

Measurement of pH

The pH was measured at 23° C. using ISFET pH meter KS701 (by Shindengen Electric Manufacturing Co.).

Evaluation of Ejection Stability

Ejection stability of respective inks was evaluated with respect to allowable dormant or resting period in a condition that an ink was filled within an ink cartridge and printing was carried out after a pre-determined period without capping or cleaning during the printing; then the dormant or resting period, till which no ejection-direction deviation appears or no change causes for the mass-flow, was measured. The ink cartridge filled with the inks was mounted to an ink-jet printer (IPSIO G707, by Ricoh Company); and the ejection stability was evaluated in accordance with the following criteria.

Evaluation Criteria
  A: 600 seconds or more
  B: 60 seconds or more and less than 600 seconds
  C: less than 60 seconds Evaluation of Color Saturation and Color Density Each recording ink, filled in an ink cartridge, was loaded to the ink-jet printer (IPSIO G707 by Ricoh Co.) in the same manner as described above, and a solid image was printed by one pass. Regular paper was used for printing test. After the print was dried, brightness was measured using a reflective spectroscopic densitometer (by X-Rite Co.). The ratio of resulting saturation color to the standard saturation color (Japan Color Version 2, yellow: 91.34, magenta: 74.55, cyan: 62.82) was calculated and evaluated in accordance with the following criteria. Inks that did not satisfy the following criteria for the respective color densities were determined as C in accordance with measurement by X-Rite densitometer.

Evaluation Criteria for Respective Colors: yellow: 0.7 or more, magenta: 0.9 or more, cyan: 0.9 or more Paper for Printing Test Regular paper: My Paper SA (by NBS Ricoh Co.), XEROX 4024 (by Fuji Xerox Office Supply), PB Paper (by Canon Inc.)

Evaluation Criteria
  A: 0.8 or more
  B: 0.7 or more and less than 0.8
  C: less than 0.7

Evaluation of Scratch Resistance

Each printed part of the image sample produced on the gloss paper by a method similar to saturation measurement was rubbed back and forth for 5 times using a white cotton cloth with a load of 900 g by a clock meter CM-1 (by Toyo Seiki Seisaku-sho, Ltd). Each sample was then visually observed and evaluated in accordance with the following criteria.

Paper for Printing Test

Gloss paper: PM Photo Print Paper (gloss) (by Seiko Epson Co.), Professional Photo paper PR-101 (by Canon Inc.)

Evaluation Criteria
  A: little or no image dropouts or blur around images
  B: a little image dropouts, some blur around images
  C: notable image dropouts and blur around images Evaluation of Water Resistance Water droplets were dropped on each printed part of image samples on regular paper formed by a similar method as the color saturation measurement, then conditions of printed matters were visually observed and evaluated in accordance with the following criteria.

Evaluation Criteria
  A: substantially no change
  B: marks appear around printed parts where water droplets being dropped
  C: bleeding appear around printed parts where water droplets being dropped Lightfastness Image samples formed by a method similar to the saturation measurement were radiated with 0.35 W/m² (340 nm) of xenon irradiance comparable to outdoor sunlight at 70° C. and 50% RH, and 89° C. at black panel temperature for 24 hours using Atlas Weatherometer Ci35AW. The resulting color deterioration/alteration before and after the irradiation was evaluated in accordance with the following criteria shown below.

Evaluation Criteria
A: substantially no change
B: recognizable change but acceptable
C: significant color deterioration/alteration

TABLE 1

|  | Ink Properties | | | Printer and Image | | | | |
|---|---|---|---|---|---|---|---|---|
|  | Stability (Change Rate) | Surface Tension (mN/m) | pH | Ejection Stability | Color Saturation Density | Scratch Resistance | Water Resistance | Light-fastness |
| Ex. A-9 | 115% | 25.4 | 8.5 | A | A | A | A | A |
| Ex. A-10 | 109% | 25.1 | 8.1 | A | A | A | A | A |
| Ex. A-11 | 112% | 25.5 | 8.3 | A | A | A | A | A |
| Ex. A-12 | 120% | 25.6 | 8.9 | A | A | A | A | A |
| Ex. A-13 | 114% | 25.3 | 8.2 | A | A | A | A | A |
| Ex. A-14 | 122% | 25.7 | 8.4 | A | A | A | A | A |
| Ex. A-15 | 123% | 25.4 | 8.2 | A | A | A | A | A |
| Ex. A-16 | 109% | 25.6 | 8.3 | A | A | A | A | A |
| Com. Ex. A-3 | 111% | 36.5 | 8.5 | A | C | A | A | A |
| Com. Ex. A-4 | 112% | 25.2 | 8.6 | A | B | C | B | A |
| Com. Ex. A-5 | 114% | 46.0 | 8.8 | A | C | B | A | A |
| Com. Ex. A-6 | 330% | 25.7 | 9.2 | C | B | A | A | A |
| Com. Ex. A-7 | 215% | 25.6 | 9.0 | C | B | A | A | A |
| Com. Ex. A-8 | — | 39.0 | 10.0 | A | A | A | C | C |

The results of Table 1 demonstrate that the recording inks of Examples A-9 to A-16 containing the inventive pigment dispersions represent superior storage stability compared to those of Comparative Examples A-3 to A-8, and also the recorded matters from the recording inks display clearness similar to that of dye-inks and afford higher reliability with superior water resistance and excellent lightfastness.

Preparation Example B-1

Preparation of Solution B-1 of Water-Soluble Polymer

| Alpha-olefin/maleic anhydride copolymer (I)*[1] | 10.0 parts |
|---|---|
| 1N LiOH aqueous solution*[2] | 17.34 parts |
| Deionized water | 72.66 parts |

*[1]expressed by the formula (1) described above, T-YP112 by Seico PMC Co., carbon-atom number of olefin chain: 20 to 24, acid value: 190 mgKOH/g, mass average molecular weight: 10000
*[2]1.2 times amount of alkali on the basis of acid value A mixture of ingredients described above were mixed under heating by a mechanical stirrer to dissolve alpha-olefin/maleic anhydride copolymer (I) expressed by the formula (1) described above, then a minute amount of insoluble matters were filtered off using a filter having an average pore size of 5 μm, thereby to prepare the solution B-1 of water-soluble polymer.

Preparation Example B-2

Preparation of Surface-Treated Black Pigment Dispersion

A carbon black (CTAB specific surface area: 150 m²/g, DBP absorption number: 100 ml/100 g) was added in an amount of 90 g to 3000 ml of 2.5 N sodium sulfonate solution, then the mixture was stirred at 300 rpm, 60° C. to react for 10 hours thereby to oxidize the carbon black. The reaction liquid was filtered, the separated carbon black was neutralized using a sodium hydroxide solution, which was then subjected to extracorporeal ultrafiltration. The resulting carbon black was rinsed with water, dried and dispersed into pure water in a solid content of 30%.

Thereafter, 6.52 parts of aqueous solution B of water-soluble polymer (expressed by the formula (1) described above, T-YP115 by Seico PMC Co. carbon-atom number of olefin chain: 16 to 18, acid value: 221 mgKOH/g, mass average molecular weight: 11000, counter ion: ammonium ion, active ingredient: 23%) was added to 100 parts of the carbon black dispersion described above to prepare a black pigment dispersion. The average particle diameter $D_{50}$ of the black pigment dispersion was 106 nm in accordance with the measurement using UPA-EX150 (by Micro Track Co.).

Preparation Example B-3

Preparation of Yellow Pigment Surfactant Dispersion

| Monoazo yellow pigment*[1] | 30.0 parts |
|---|---|
| Polyoxyethylene styrenephenylether*[2] | 10.0 parts |
| Deionized water | 60.0 parts |

*[1]C.I. pigment yellow 74, by Dainichiseika Color & Chemicals Mfg. Co.
*[2]Noigen EA-177, nonionic surfactant, HLB value: 15.7, by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 4 hours by use of KDLA Model Dyno-Mill wet-type disperser (by WAB Machinery Co.) filled with zirconia beads of 0.5 mm diameter thereby to prepare a primary pigment dispersion.

Then, 2.13 parts of a water-soluble polyurethane (Takelack W-5661, by Mitsui Takeda Chemicals, Inc., active ingredient: 35.2%) of a water-soluble polymer aqueous solution and 2.93 parts of aqueous solution C of water-soluble polymer (expressed by the formula (1) described above, T-YP114 by Seico PMC Co., carbon-atom number of olefin chain: 12 to 14, acid value: 385 mgKOH/g, molecular weight: 9000, counter ion: ammonium ion, active ingredient: 25.6%) were added to the primary pigment dispersion and the mixture was stirred sufficiently to prepare a yellow pigment surfactant dispersion. The average particle diameter $D_{50}$ of the pigments surfactant dispersion was 49 nm in accordance with the measurement using UPA-EX150 (by Micro Track Co.).

Preparation Example B-4

Preparation of Magenta Pigment Surfactant Dispersion

| | |
|---|---|
| Quinacridone pigment (C.I. pigment red 122)*[1] | 30.0 parts |
| Polyoxyethylene beta-naphthylether (RT-100)*[2] | 10.0 parts |
| Deionized water | 60.0 parts |

*[1]by Dainichiseika Color & Chemicals Mfg. Co.
*[2]nonionic surfactant, HLB value: 18.5, by Takemoto Oil & Fat Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion.

Then, 3.57 parts of a water-soluble styrene/acrylic copolymer (JC-05 by Seico PMC Co., active ingredient: 21%) and 2.97 parts of aqueous solution D of water-soluble polymer (expressed by the formula (1) described above, T-YP116 by Seico PMC Co., carbon-atom number of olefin chain: 16 to 18, acid value: 280 to 310 mgKOH/g, mass average molecular weight: 11400, counter ion: ammonium ion, active ingredient: 25.3%) were added to the primary pigment dispersion and the mixture was stirred sufficiently to prepare a magenta pigment surfactant dispersion. The average particle diameter $D_{50}$ of the pigment surfactant dispersion was 81 nm in accordance with the measurement using UPA-EX150 (by Micro Track Co.).

Preparation Example B-5

Preparation of Cyan Pigment Surfactant Dispersion A

| | |
|---|---|
| Phthalocyanine pigment*[1] | 30.0 parts |
| Polyoxyethylene laurylether (DKS NL-450)*[2] | 10.0 parts |
| Deionized water | 60.0 parts |

*[1]C.I. pigment blue 15:3, by Dainichiseika Color & Chemicals Mfg. Co.
*[2]nonionic surfactant, HLB value: 18.3, by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion.

Then, 2.51 parts of a water-soluble polyester (Nichigo Polyester W-0030 by Nippon Synthetic Chemical Industry Co., active ingredient: 29.9%) of a water-soluble polymer aqueous solution and 3.26 parts of aqueous solution B of water-soluble polymer (expressed by the formula (1) described above, T-YP115 by Seico PMC Co., carbon-atom number of olefin chain: 16 to 18, acid value: 221 mgKOH/g, mass average molecular weight: 11000, counter ion: ammonium ion, active ingredient: 23%) were added to the primary pigment dispersion and the mixture was stirred sufficiently to prepare a magenta pigment surfactant dispersion. The average particle diameter $D_{50}$ of the pigment surfactant dispersion was 75 μm in accordance with the measurement using UPA-EX150 (by Micro Track Co.).

Preparation Example B-6

Preparation of Cyan Pigment Surfactant Dispersion B

| | |
|---|---|
| Phthalocyanine pigment*[1] | 30.0 parts |
| Polyoxyethylene styrenephenylether*[2] | 10.0 parts |
| Deionized water | 60.0 parts |

*[1]C.I. pigment blue 15:3, by Dainichiseika Color & Chemicals Mfg. Co.
*[2]Noigen EA-177, nonionic surfactant, HLB value: 15.7, by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a primary pigment dispersion.

Then, 15.0 parts of the aqueous solution B-1 of the water-soluble polymer of the Preparation Example B-1 was added to the primary pigment dispersion and the mixture was stirred sufficiently to prepare a cyan pigment surfactant dispersion B. The average particle diameter $D_{50}$ of the pigment surfactant dispersion was 83 nm in accordance with the measurement using UPA-EX150 (by Micro Track Co.).

Preparation Example B-7

Preparation of Cyan Pigment Surfactant Dispersion C

| | |
|---|---|
| Phthalocyanine pigment*[1] | 30.0 parts |
| Polyoxyethylene laurylether (DKS NL-450)*[2] | 10.0 parts |
| Deionized water | 60.0 parts |

*[1]C.I. pigment blue 15:3, by Dainichiseika Color & Chemicals Mfg. Co.
*[2]nonionic surfactant, HLB value: 18.3, by Dai-ichi Kogyo Seiyaku Co.

Initially, the surfactant described above was dissolved into deionized water to prepare a solution, then the solution was mixed with to wet the pigment described above sufficiently. The mixture was then dispersed at 2000 rpm for 2 hours by use of KDLA Model Dyno-Mill wet-type disperser (by WAB Machinery Co.) filled with zirconia beads of 0.5 mm diameter thereby to prepare a cyan pigment surfactant dispersion C. The average particle diameter $D_{50}$ of the pigment surfactant dispersion was 75 nm in accordance with the measurement using UPA-EX150 (by Micro Track Co.).

Examples B-1 to B-11 and Comparative Example B-1 to B-6

Preparation of Recording Ink

Inks were prepared in the following manner. The humectants, wetting agents, surfactants and water were mixed in the amounts and ingredients shown in Tables 2, 3 and 4, and stirred for one hour to form uniform mixtures. To the respective mixtures, resin dispersions were added and stirred for one hour, then pigment dispersions, antiseptic/antifungal agents and a defoamer were added and mixed further one hour. The resulting respective dispersions were then press-filtered through a cellulose acetate membrane filter of 0.8 μm average pore size to remove coarse particles and impurities to prepare recording inks for evaluation.

TABLE 2

| Ingredient | Examples | | | | | |
|---|---|---|---|---|---|---|
| | B-1 | B-2 | B-3 | B-4 | B-5 | B-6 |
| Pigment Dispersion | | | | | | |
| Surface Treated Black Pigment | 28.41 | 21.3 | | | | |
| Yellow Pigment Surfactant | | | 20.86 | 13.91 | | |
| Magenta Pigment Surfactant | | | | | | 28.57 |
| Cyan Pigment Surfactant A | | | | | | |
| Cyan Pigment Surfactant B | | | | | 11.5 | |
| Cyan Pigment Surfactant C | | | | | | |
| Resin Dispersion | | | | | | |
| Acrylic Silicone Emulsion | 40 | 45 | 45 | 60 | 40 | 40 |
| Acrylic Emulsion | | | | | 17.02 | |
| Polyurethane Emulsion | | | | | | |
| Polyester Emulsion | | | | | | |
| Humectant | | | | | | |
| 3-methyl-1,3-butanediol | 18.92 | 16.8 | | | | |
| triethylene glycol | | | 8 | | | 6 |
| 1,3-butanediol | | | 13 | 15.6 | 19.5 | 12 |
| N-methyl-2-pyrrolidone | | | | | | |
| glycerin | 6.31 | 8.4 | 7 | 5.2 | 6.5 | 6 |
| Wetting Agent | | | | | | |
| octanediol | 2 | 2 | 2 | 2 | | 1 |
| 1,2-hexanediol | | | | | 2 | 1 |
| Surfactant | | | | | | |
| Polyfox PF-151N | | | | 2 | 1 | |
| Zoneal FS-300 | 2.5 | 2.5 | | 2.5 | 1.5 | 2.5 |
| Softanol EP-5035 | | | | | | |
| Antiseptic/Antifungal Agent | | | | | | |
| Proxel GXL | 0.05 | 0.05 | 0.05 | 0.05 | 0.05 | 0.05 |
| Defoamer | | | | | | |
| silicone defoamer KM-72F | 0.1 | 0.1 | 0.1 | 0.1 | 0.1 | 0.1 |
| Pure Water | balance | balance | balance | balance | balance | balance |
| Total (% by mass) | 100 | 100 | 100 | 100 | 100 | 100 |

TABLE 3

| Ingredient | Examples | | | | |
|---|---|---|---|---|---|
| | B-7 | B-8 | B-9 | B-10 | B-11 |
| Pigment Dispersion | | | | | |
| Surface Treated Black Pigment | | | | | |
| Yellow Pigment Surfactant | | | | | |
| Magenta Pigment Surfactant | 21.43 | | | | |
| Cyan Pigment Surfactant A | | | | 21 | |
| Cyan Pigment Surfactant B | | 22.99 | 15.33 | | 19.16 |
| Cyan Pigment Surfactant C | | | | | |
| Resin Dispersion | | | | | |
| Acrylic Silicone Emulsion | 30 | 40 | 40 | | 31.25 |
| Acrylic Emulsion | | | | 45 | |
| Polyurethane Emulsion | 24 | | 16 | | |
| Polyester Emulsion | | 6.67 | | | |
| Humectant | | | | | |
| 3-methyl-1,3-butanediol | | | | 18.92 | |
| triethylene glycol | | | | | |
| 1,3-butanediol | 15.3 | 18.92 | 18 | | 20.4 |
| N-methyl-2-pyrrolidone | | | | 1.31 | |
| glycerin | 5.1 | 6.31 | 6 | 5 | 6.8 |

TABLE 3-continued

|  | Examples | | | | |
|---|---|---|---|---|---|
| Ingredient | B-7 | B-8 | B-9 | B-10 | B-11 |
| Wetting Agent | | | | | |
| octanediol | 1 | 2 | 2 | | 2 |
| 1,2-hexanediol | 1 | | | 2 | |
| Surfactant | | | | | |
| Polyfox PF-151N | | | | 2 | |
| Zoneal FS-300 | 2 | | 2.5 | | 2.5 |
| Softanol EP-5035 | | 1 | | | |
| Antiseptic/Antifungal Agent | | | | | |
| Proxel GXL | 0.05 | 0.05 | 0.05 | 0.05 | 0.05 |
| Defoamer | | | | | |
| silicone defoamer KM-72F | 0.1 | 0.1 | 0.1 | 0.1 | 0.1 |
| Pure Water | balance | balance | balance | balance | balance |
| Total (% by mass) | 100 | 100 | 100 | 100 | 100 |

TABLE 4

|  | Comparative Examples | | | | | |
|---|---|---|---|---|---|---|
| Ingredient | B-1 | B-2 | B-3 | B-4 | B-5 | B-6 |
| Pigment Dispersion | | | | | | |
| Surface Treated Black Pigment | 21.3 | | | | | 21.3 |
| Yellow Pigment Surfactant | | 20.86 | | | | |
| Magenta Pigment Surfactant | | | | 28.57 | | |
| Cyan Pigment Surfactant A | | | | | | |
| Cyan Pigment Surfactant B | | | | | 22.99 | |
| Cyan Pigment Surfactant C | | | 20.0 | | | |
| Resin Dispersion | | | | | | |
| Acrylic Silicone Emulsion | | 5 | | | | |
| Acrylic Emulsion | 3.19 | | | | 8.51 | |
| Polyurethane Emulsion | | | | | | 3 |
| Polyester Emulsion | | | 40 | | | |
| Humectant | | | | | | |
| 3-methyl-1,3-butanediol | | 10 | | 20 | | 20 |
| triethylene glycol | 20 | 15 | 10 | | | |
| 1,3-butanediol | | | | | 21 | |
| N-methyl-2-pyrrolidone | | | | | | |
| glycerin | 10 | 15 | 5 | 10 | 7 | 4 |
| Wetting Agent | | | | | | |
| octanediol | | 2 | 2 | | | |
| 1,2-hexanediol | 1 | | | | 3 | 2 |
| Surfactant | | | | | | |
| Polyfox PF-151N | | 2 | 2 | | 2 | |
| Zoneal FS-300 | | | | | | 2.5 |
| Softanol EP-5035 | 2 | | | | | |
| Antiseptic/Antifungal Agent | | | | | | |
| Proxel GXL | 0.05 | 0.05 | 0.05 | 0.05 | 0.05 | 0.05 |
| Defoamer | | | | | | |
| silicone defoamer KM-72F | 0.1 | 0.1 | 0.1 | 0.1 | 0.1 | 0.1 |
| Pure Water | balance | balance | balance | balance | balance | balance |
| Total (% by mass) | 100 | 100 | 100 | 100 | 100 | 100 |

The ingredients in Tables 2 to 4 indicate the following materials.

Acrylic Silicone Emulsion: solid content: 40%, average particle diameter: 130 nm, MFT: 0° C. or lower, by Toyo Ink Mfg. Co.

Acrylic Emulsion: Johns Clear 7600, solid content: 47%, average particle diameter: 90 nm, MFT: 10° C. or lower, by Johnson Polymer Co.

Polyurethane Emulsion: Hydran HW-930, solid content: 50%, average particle diameter: 200 nm or less, MFT: 0° C. or lower, by DIC Co.

Polyester Emulsion: Pesresin A-520, solid content: 30%, average particle diameter: 100 nm or less, MFT: 30° C. or lower, by Takamatsu Oil & Fat Co.

Polyfox PF-151N: oligomer-type nonionic fluorine-containing surfactant, active ingredient: 50%, by Omnova Co.

Zoneal FS-300: polyoxyethylene perfluoroalkylether, active ingredient: 40%, by DuPont Co.

Softanol EP-5035: polyoxyethylene polyoxypropylene branched alkylether, active ingredient: 100% by Nippon Shokubai Co.

Proxel GXL: key ingredient: 1,2-benzisothiazolin-3-one, antifungal agent, active ingredient: 20%, with dipropylene glycol, by Avecia Co.

KM-72F: self-emulsifying silicone defoamer, active ingredient: 100%, by Shin-Etsu Chemical Co.

The recording inks of Examples B-1 to B-11 and Comparative Examples B-1 to B-6 were evaluated in accordance with the evaluation methods shown below. The results are shown in Tables 5 and 6.

Resin Amount Versus Pigment

The ratio of amounts of resin dispersions to solid contents of pigments in the inks was calculated by: ratio=solid content of resin/solid content of pigment.

Solid Content of Ink

The total content of pigments and resins (emulsion plus water-soluble resin) in inks was obtained.

Measurement of Ink Viscosity

Viscosity of inks was measured at 25° C. using a viscometer (RL-500, by Toki Sangyo Co.).

Measurement of Surface Tension of Ink

Surface tension of inks was measured at 25° C. using an automatic surface tension meter (CBVP-Z, by Kyowa Interface Science Co.).

Arrangement of Printing Evaluation

A ink-jet printer (IPSIO G707, by Ricoh Co.) was set up so as to apply an equivalent amount of inks onto recording media by adjusting driving voltage on a piezoelectric element under a condition of temperature 23° C. and relative humidity 50%.

Ejection Stability

A chart, formed using Microsoft Word 2000 (by Microsoft Co.), to paint 5% area of A4 paper with a solid image per one color was printed consequently on 200 sheets of Type 6200 paper (by NBS Ricoh Co.), then ejection disturbance was evaluated. The printing mode was selected as "no color correction" modified from "regular plain paper & standard fast" in accordance with user setup attached to the printer.

Evaluation Criteria

A: no ejection disturbance
B: some ejection disturbance
D: significant disturbance or no ejection Image Density A chart, formed using Microsoft Word 2000 (by Microsoft Co.), with a 64 point symbol "■"was printed on Xerox 4024 paper (Fuji Xerox Co.), the color of the symbol "■"part on the print surface was measured using X-Rite 938 and evaluated by the following evaluation criteria. The printing mode was selected as "no color correction" modified from "regular plain paper & standard fast" in accordance with user setup attached to the printer.

Evaluation Criteria

A: black≧1.3, yellow≧0.85, magenta≧0.95, cyan≧1.1
B: 1.3>black≧1.2, 0.85>yellow≧0.80, 0.95>magenta≧0.90, 1.1>cyan≧1.0
C: 1.2>black≧1.1, 0.80>yellow≧0.70, 0.90>magenta≧0.80, 1.0>cyan≧0.9
D: 1.1>black, 0.70>yellow, 0.80>magenta, 0.9>cyan Color Development A chart, formed using Microsoft Word 2000 (by Microsoft Co.), similar with that of the image density described above was printed on Xerox 4024 paper (Fuji Xerox Co.), the symbol "■"part on the print surface was measured using X-Rite 938. The printing mode was selected as "no color correction" modified from "regular plain paper & standard fast" in accordance with user setup attached to the printer. The ratio of measured color saturation to that of the standard color (Japan color ver.2, yellow: 91.34, magenta: 74.55, cyan: 62.82) was calculated to evaluate by the following evaluation criteria.

Evaluation Criteria

A: 0.8 or more
B: less than 0.8

Water Resistance

A chart was printed on Xerox Type 6200 paper (by NBS Ricoh Co.) in a similar manner as the image density, then the symbol "■"part on the print surface was dried at temperature 23° C. and 50% RH for 24 hours. The dried chart was then immersed in water at 30° C. for one minutes, slowly lifted up, and dried mildly, then evaluated by the following evaluation criteria.

Evaluation Criteria

A: no bleeding of color
B: some bleeding of color

Scratch Resistance

A chart, formed using Microsoft Word 2000 (by Microsoft Co.), with a monocolor solid image of 3 cm by 3 cm was printed on matte glossy paper dedicated for Ricoh Gel Jet Printer (by NBS Ricoh Co.), and the resulting recorded matter was dried at 23° C. and 50% RH for 24 hours. Then JIS L 0803 cotton No. 3, attached to CM-1 type clock meter by use of a double stick tape, was reciprocated on the recorded matter 5 times so as to rub its printed part, then ink stain on the cotton fabric was measured using X-Rite 938 while subtracting the background density, and the scratch resistance was evaluated by the following evaluation criteria.

Evaluation Criteria

A: less than 0.1 of stain density
B: 0.1 or more of stain density

Lightfastness

A chart was printed on Type 6200 paper (by NBS Ricoh Co.), in a similar manner with that of the image density described above, then the symbol "■"part on the print surface was dried at temperature 23° C. and 50% RH for 24 hours. This image portion was irradiated with 0.35 W/m$^2$ (340 nm) of xenon irradiance comparable to outdoor sunlight at 70° C. and 50% RH, and 89° C. at black panel temperature for 24 hours using Atlas Weatherometer Ci35AW. The resulting color deterioration and alteration before and after the irradiation was evaluated in accordance with the following criteria shown below.

Evaluation Criteria

A: substantially no change
B: recognizable change but acceptable
C: significant color deterioration/alteration Drying Property A chart was printed on Type 6200 paper (by NBS Ricoh Co.), in a similar manner with that of the image density described above, then the symbol "■"part on the print surface was contacted and pushed to a filter paper immediately after the printing, and the occurrence of transfer was evaluated.

A: no transfer and staining
B: slight transfer and staining
C: significant transfer and staining

TABLE 5

| | Ink Properties | | | | |
|---|---|---|---|---|---|
| | Resin/ Pigment | Solid Content of Ink (% by mass) | Lubricant (% by mass) | Viscosity (mPa·s) | Surface Tension (mN/m) |
| Ex. B-1 | 2.0 | 24.4 | 25.2 | 15.7 | 26.0 |
| Ex. B-2 | 3.0 | 24.3 | 25.2 | 14.8 | 26.2 |
| Ex. B-3 | 3.0 | 24.3 | 28.0 | 15.2 | 26.8 |
| Ex. B-4 | 6.0 | 28.2 | 20.8 | 12.8 | 26.3 |
| Ex. B-5 | 8.0 | 27.2 | 26.0 | 13.5 | 26.4 |
| Ex. B-6 | 2.0 | 24.4 | 24.0 | 18.8 | 26.4 |
| Ex. B-7 | 4.0 | 30.3 | 20.4 | 14.2 | 26.6 |
| Ex. B-8 | 3.0 | 24.3 | 25.2 | 16.1 | 31.2 |
| Ex. B-9 | 6.0 | 28.2 | 24.0 | 14.3 | 26.2 |
| Ex. B-10 | 3.5 | 27.3 | 25.2 | 17.5 | 26.9 |
| Ex. B-11 | 2.5 | 17.75 | 27.2 | 9.6 | 26.8 |
| Com. Ex. B-1 | 0.25 | 8.0 | 30.0 | 8.4 | 30.3 |
| Com. Ex. B-2 | 0.33 | 8.3 | 40.0 | 21.5 | 26.1 |
| Com. Ex. B-3 | 2.0 | 18.0 | 15.0 | 7.8 | 25.1 |
| Com. Ex. B-4 | 0.5 | 12.4 | 30.0 | 9.2 | 37.5 |
| Com. Ex. B-5 | — | 6.3 | 28.0 | 7.4 | 25.7 |
| Com. Ex. B-6 | 0.25 | 7.8 | 24.0 | 4.5 | 25.1 |

TABLE 6

| | Evaluation on Printer & Image | | | | | | |
|---|---|---|---|---|---|---|---|
| | Ejection Stability | Image Density | Color Development | Water Resistance | Scratch Resistance | Light-fastness | Drying Property |
| Ex. B-1 | A | A | — | A | A | A | A |
| Ex. B-2 | A | B | — | A | A | A | A |
| Ex. B-3 | A | A | A | A | A | A | A |
| Ex. B-4 | A | B | A | A | A | A | A |
| Ex. B-5 | A | B | A | A | A | A | A |
| Ex. B-6 | A | A | A | A | A | A | A |
| Ex. B-7 | A | B | A | A | A | A | A |
| Ex. B-8 | A | A | A | A | A | A | B |
| Ex. B-9 | A | A | A | A | A | A | A |
| Ex. B-10 | B | A | A | A | A | A | A |
| Ex. B-11 | A | A | A | A | A | A | A |
| Com. Ex. B-1 | A | C | — | A | A | A | C |
| Com. Ex. B-2 | C | | | unavailable data | | | |
| Com. Ex. B-3 | C | | | unavailable data | | | |
| Com. Ex. B-4 | A | B | B | A | A | A | C |
| Com. Ex. B-5 | A | C | B | B | B | B | B |
| Com. Ex. B-6 | A | C | — | B | B | A | C |

In comparative Example B-0.2 excessively high viscosity disturbed normal printing.

In comparative Example B-3, the excessively small amount of the humectant prevented normal printing.

The mark "-" in Table 6 indicates that no data was obtained.

INDUSTRIAL APPLICABILITY

The inks according to the present invention, which including the pigment dispersions according to the present invention, may certainly provide excellent color development, superior image quality and higher reliability, and may form high-quality images with higher color saturation and proper color tone on not only dedicated recording paper but also on regular paper, thus may be favorably utilized for ink cartridges, ink recorded matters, ink-jet recording apparatuses and ink-jet recording methods.

The ink-jet recording apparatuses and ink-jet recording methods according to the present invention may be applied to various recordings of ink-jet recording processes, and also favorably utilized for ink-jet recording printers, facsimiles, copiers, and printer/facsimile/copier complex apparatuses in particular.

The invention claimed is:

1. A pigment dispersion, comprising a pigment, a pigment dispersant, a polymer dispersion stabilizer and water,
   wherein the pigment dispersant is an anionic surfactant or a nonionic surfactant, having an HLB value of 10 to 20, and
   wherein the polymer dispersion stabilizer is an alpha-olefin/maleic anhydride copolymer expressed by the formula (1) below:

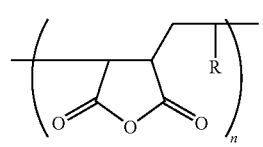

Formula (1)

wherein R is an alkyl group having 6 to 25 carbon atoms, and wherein a mass average molecular weight of the alpha-olefin/maleic anhydride copolymer is 5000 to 20000.

2. The pigment dispersion of claim 1, wherein an acid value of the alpha-olefin/maleic anhydride copolymer is 100 to 400 mgKOH/g.

3. The pigment dispersion of claim 2, wherein the alpha-olefin/maleic anhydride copolymer is used as a solution in an alkaline solution or in an alkaline aqueous solution, and an alkali amount in the alkaline solution or in the alkaline aqueous solution is no less than that corresponding to the acid value of the alpha-olefin/maleic anhydride copolymer.

4. The pigment dispersion of claim 1, wherein the pigment is an organic pigment.

5. The pigment dispersion of claim 4, wherein the organic pigment is one selected from the group consisting of a phthalocyanine pigment, a quinacridone pigment and a monoazo yellow pigment.

6. The pigment dispersion of claim 1, wherein an average particle diameter $D_{50}$ of the pigment dispersion is no larger than 150 nm.

7. The pigment dispersion of claim 1, wherein the pigment dispersant is one selected from the group consisting of polyoxyethylene beta-naphthylether, polyoxyethylene laurylether, polyoxyethylene styrenephenylether, and sodium dioctylsulfosuccinate.

8. The pigment dispersion of claim 1, wherein an acid value of the alpha-olefin/maleic anhydride copolymer is 100 to 350 mgKOH/g.

9. The pigment dispersion of claim 1, wherein the pigment is a complex pigment comprising inorganic pigment particles coated with an organic pigment.

10. The pigment dispersion of claim 9, wherein the inorganic pigment particles are at least one selected from the group consisting of titanium dioxide particles, silica particles, alumina particles, iron oxide particles, iron hydroxide particles and tin oxide particles.

11. The pigment dispersion of claim 9, wherein the organic pigment is one selected from the group consisting of a phthalocyanine pigment, a quinacridone pigment and a monoazo yellow pigment.

12. The pigment dispersion of claim 9,
wherein the inorganic pigment particles are at least one selected from the group consisting of titanium dioxide particles, silica particles, alumina particles, iron oxide particles, iron hydroxide particles and tin oxide particles, and
wherein the organic pigment is one selected from the group consisting of a phthalocyanine pigment, a quinacridone pigment and a monoazo yellow pigment.

13. The pigment dispersion of claim 9, comprising the inorganic pigment particles and the organic pigment in a mass ratio range of 3:1 to 1:3.

14. The pigment dispersion of claim 9, comprising the inorganic pigment particles and the organic pigment in a mass ratio range of 3:2 to 1:2.

15. The pigment dispersion of claim 1, wherein an average particle diameter $D_{50}$ of the pigment dispersion is no larger than 100 nm.

16. The pigment dispersion of claim 1, comprising the pigment dispersant and the pigment in a mass ratio range of 1:100 to 1:1.

17. The pigment dispersion of claim 1, comprising the pigment dispersant and the pigment in a mass ratio range of 1:10 to 1:2.

18. The pigment dispersion of claim 1, wherein the pigment dispersant is an anionic surfactant.

19. The pigment dispersion of claim 1, wherein the pigment dispersant is a nonionic surfactant.

* * * * *